United States Patent
Erivantcev et al.

(10) Patent No.: US 10,860,091 B2
(45) Date of Patent: *Dec. 8, 2020

(54) MOTION PREDICTIONS OF OVERLAPPING KINEMATIC CHAINS OF A SKELETON MODEL USED TO CONTROL A COMPUTER SYSTEM

(71) Applicant: Finch Technologies Ltd., Fish Bay, Tortola (VG)

(72) Inventors: Viktor Vladimirovich Erivantcev, Ufa (RU); Alexander Sergeevich Lobanov, Ufa (RU); Alexey Ivanovich Kartashov, Moscow (RU); Daniil Olegovich Goncharov, Ufa (RU)

(73) Assignee: Finch Technologies Ltd., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,573

(22) Filed: Mar. 23, 2020

(65) Prior Publication Data

US 2020/0225738 A1 Jul. 16, 2020

Related U.S. Application Data

(63) Continuation of application No. 16/532,880, filed on Aug. 6, 2019, now Pat. No. 10,635,166, which is a
(Continued)

(51) Int. Cl.
*G06F 3/01* (2006.01)
*G06N 3/04* (2006.01)
(Continued)

(52) U.S. Cl.
CPC ............ *G06F 3/011* (2013.01); *G06F 3/0346* (2013.01); *G06N 3/0445* (2013.01); *G06N 3/0454* (2013.01); *G06N 3/08* (2013.01)

(58) Field of Classification Search
CPC ..... G06F 3/011; G06F 3/0346; G06N 3/0445; G06N 3/08; G06N 3/0454
See application file for complete search history.

(56) References Cited

U.S. PATENT DOCUMENTS

| | | | |
|---|---|---|---|
| 5,515,477 A | 5/1996 | Sutherland | |
| 8,187,100 B1 | 5/2012 | Kahn et al. | |
| (Continued) | | | |

FOREIGN PATENT DOCUMENTS

| | | |
|---|---|---|
| CN | 103226398 | 7/2013 |
| WO | 2016183812 | 11/2016 |
| WO | 2016209819 | 12/2016 |

OTHER PUBLICATIONS

Accessories for Vive, retrieved from https://www.vive.com/us/accessory/ on Jan. 30, 2017.
(Continued)

*Primary Examiner* — Muhammad N Edun
(74) *Attorney, Agent, or Firm* — Greenberg Traurig, LLP

(57) ABSTRACT

A system having sensor modules and a computing device. Each sensor module has an inertial measurement unit attached to a portion of a user to generate motion data identifying a sequence of orientations of the portion. The sensor modules include a first subset and a second subset that share a common sensor module. The computing device provides orientation measurements generated by the first subset as input to a first artificial neural network to obtain at least one first orientation measurement of the common module, provides orientation measurements generated by the second subset as input to a second artificial neural network to obtain at least one second orientation measurement of the common module, and generates, a predicted orientation measurement of the common module by combining the at least one first orientation measurement of the
(Continued)

common module and the at least one second orientation measurement of the common module.

20 Claims, 9 Drawing Sheets

Related U.S. Application Data continuation of application No. 15/996,389, filed on Jun. 1, 2018, now Pat. No. 10,416,755.

(51) Int. Cl.
*G06F 3/0346* (2013.01)
*G06N 3/08* (2006.01)

(56) References Cited

U.S. PATENT DOCUMENTS

| | | | |
|---|---|---|---|
| 8,933,886 B2 | 1/2015 | Imoto et al. |
| 8,988,438 B2 | 3/2015 | Bang et al. |
| 9,141,194 B1 | 9/2015 | Keyes et al. |
| 9,278,453 B2 | 3/2016 | Assad |
| 9,405,372 B2 | 8/2016 | Yen et al. |
| D772,986 S | 11/2016 | Chen et al. |
| 9,504,414 B2 | 11/2016 | Coza et al. |
| 9,600,925 B2 | 3/2017 | Katz et al. |
| 9,827,496 B1 | 11/2017 | Zinno |
| 9,891,718 B2 | 2/2018 | Connor |
| 9,996,945 B1 | 6/2018 | Holzer et al. |
| 10,019,806 B2 | 7/2018 | Perry et al. |
| 10,379,613 B2 | 8/2019 | Erivantcev et al. |
| 10,416,755 B1 | 9/2019 | Erivantcev et al. |
| 10,509,464 B2 | 12/2019 | Erivantcev et al. |
| 10,509,469 B2 | 12/2019 | Erivantcev et al. |
| 10,521,011 B2 | 12/2019 | Erivantcev et al. |
| 10,534,431 B2 | 1/2020 | Erivantcev et al. |
| 10,540,006 B2 | 1/2020 | Erivantcev et al. |
| 2003/0142065 A1 | 7/2003 | Pahlavan |
| 2003/0193572 A1 | 10/2003 | Wilson et al. |
| 2007/0050597 A1 | 3/2007 | Ikeda |
| 2007/0273610 A1 | 11/2007 | Baillot |
| 2008/0088468 A1 | 4/2008 | Kim |
| 2008/0262772 A1 | 10/2008 | Luinge et al. |
| 2009/0322763 A1 | 12/2009 | Bang et al. |
| 2010/0079466 A1 | 4/2010 | Griffin |
| 2010/0194879 A1 | 8/2010 | Pasveer et al. |
| 2010/0307241 A1 | 12/2010 | Raman et al. |
| 2011/0025853 A1 | 2/2011 | Richardson |
| 2011/0161804 A1 | 6/2011 | Park et al. |
| 2011/0228251 A1 | 9/2011 | Yee et al. |
| 2012/0025945 A1 | 2/2012 | Yazadi et al. |
| 2012/0130203 A1 | 5/2012 | Stergiou et al. |
| 2012/0214591 A1 | 8/2012 | Ito et al. |
| 2012/0293410 A1 | 11/2012 | Bell |
| 2014/0028547 A1 | 1/2014 | Bromley et al. |
| 2014/0201689 A1 | 7/2014 | Bedikian et al. |
| 2014/0313022 A1 | 10/2014 | Moeller et al. |
| 2015/0062086 A1 | 3/2015 | Nattukallingal |
| 2015/0077347 A1 | 3/2015 | OGreen |
| 2015/0145860 A1 | 5/2015 | Craig et al. |
| 2015/0145985 A1 | 5/2015 | Gourlay et al. |
| 2015/0154453 A1 | 6/2015 | Wilf |
| 2015/0177842 A1 | 6/2015 | Rudenko |
| 2015/0213653 A1 | 7/2015 | Kord |
| 2015/0277559 A1 | 10/2015 | Vescovi et al. |
| 2015/0358543 A1 | 12/2015 | Kord |
| 2016/0005232 A1 | 1/2016 | Quarles |
| 2016/0054797 A1 | 2/2016 | Tokubo et al. |
| 2016/0077608 A1 | 3/2016 | Nakasu et al. |
| 2016/0085310 A1 | 3/2016 | Shotton et al. |
| 2016/0187969 A1 | 6/2016 | Larsen et al. |
| 2016/0306431 A1 | 10/2016 | Stafford et al. |
| 2016/0313798 A1 | 10/2016 | Connor |
| 2016/0335486 A1 | 11/2016 | Fleishman et al. |
| 2016/0338644 A1 | 11/2016 | Connor |
| 2016/0378204 A1 | 12/2016 | Chen et al. |
| 2017/0053454 A1 | 2/2017 | Katz et al. |
| 2017/0083084 A1 | 3/2017 | Tatsuta et al. |
| 2017/0115728 A1 | 4/2017 | Park et al. |
| 2017/0147066 A1 | 5/2017 | Katz et al. |
| 2017/0168586 A1 | 6/2017 | Sinha et al. |
| 2017/0186226 A1 | 6/2017 | Cashman et al. |
| 2017/0308165 A1 | 10/2017 | Erivantcev et al. |
| 2017/0344829 A1 | 11/2017 | Lan et al. |
| 2017/0347885 A1 | 12/2017 | Tan et al. |
| 2017/0352188 A1 | 12/2017 | Levitt |
| 2017/0371403 A1 | 12/2017 | Wetzler et al. |
| 2018/0008196 A1 | 1/2018 | Connor |
| 2018/0020978 A1 | 1/2018 | Kaifosh et al. |
| 2018/0095637 A1 | 4/2018 | Valdivia et al. |
| 2018/0101989 A1 | 4/2018 | Frueh et al. |
| 2018/0106618 A1 | 4/2018 | Cerchio et al. |
| 2018/0122098 A1 | 5/2018 | Wang et al. |
| 2018/0165879 A1 | 6/2018 | Holzer et al. |
| 2018/0217680 A1 | 8/2018 | Sudou et al. |
| 2018/0225517 A1 | 8/2018 | Holzer et al. |
| 2018/0253142 A1 | 9/2018 | Tsuchie et al. |
| 2018/0293756 A1 | 10/2018 | Liu et al. |
| 2018/0313867 A1 | 11/2018 | Erivantcev et al. |
| 2018/0330521 A1 | 11/2018 | Samples et al. |
| 2018/0335834 A1 | 11/2018 | Erivantcev et al. |
| 2018/0335843 A1 | 11/2018 | Erivantcev et al. |
| 2018/0335855 A1 | 11/2018 | Erivantcev et al. |
| 2018/0350105 A1 | 12/2018 | Taylor et al. |
| 2019/0187784 A1 | 6/2019 | Erivantcev et al. |
| 2019/0212359 A1 | 7/2019 | Erivantcev et al. |
| 2019/0212807 A1 | 7/2019 | Erivantcev et al. |
| 2019/0332171 A1 | 10/2019 | Erivantcev et al. |
| 2019/0339766 A1 | 11/2019 | Erivantcev et al. |
| 2019/0369715 A1 | 12/2019 | Erivantcev et al. |
| 2020/0033937 A1 | 1/2020 | Erivantcev et al. |
| 2020/0073483 A1 | 3/2020 | Berenzweig et al. |
| 2020/0081534 A1 | 3/2020 | Erivantcev et al. |

OTHER PUBLICATIONS

Ben Lang, "Google Demonstrates Promising Low-cost, Mobile Inside-out Controller Tracking", https://www.roadtovr.com/google-mobile-6dof-vr-controller-tracking-inside-out/, Apr. 28, 2018.
Ben Lang, "Oculus Claims Breakthrough in Hand-tracking Accuracy", https://www.roadtovr.com/oculus-claims-breakthrough-in-hand-tracking-accuracy/, May 3, 2018.
Camera Calibration and 3D Reconstruction, OpenCV 2.4.13.6 documentation, https://docs.opencv.org/2.4/modules/calib3d/doc/camera_calibration_and_3d_reconstruction.html, printed on Jun. 11, 2018.
Daydream, retrieved from https://vr.google.com/daydream/ on Jan. 30, 2017.
Forward kinematics, Wikipedia, retrieved from https://en.wikipedia.org/wiki/Forward_kinematics on Sep. 21, 2017.
Gest—Work with your hands. Wayback Machine 2016. Retrieved from https://web.archive.org/web/20160304012247/https://gest.co/ on Jan. 30, 2017.
Gloveone: Feel Virtual Reality. Wayback Machine 2016. Retrieved from https://web.archive.org/web/20160307080001/https://www.gloveonevr.com/ on Jan. 30, 2017.
International Application No. PCT/US2017/028982, International Search Report and Written Opinion, dated Aug. 24, 2017.
Kinematic chain, Wikipedia, printed on Apr. 23, 2018.
Manus VR—The Pinnacle of Virtual Reality Controllers, Manus VR Development Kit Pro Q4 2016.
Manus VR—The virtual reality dataglove for consumers. Wayback Machine 2016. Retrieved from https://web.archive.org/web/20160417035626/https://manusvr.com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/rift/ on Jan. 30, 2017.
Reinforcement learning, Wikipedia, printed on Apr. 25, 2018.
RevolVR Virtual Reality Controllers, retrieved from http://revolvr.co/ on Jan. 30, 2017.

(56) References Cited

OTHER PUBLICATIONS

Stereo camera, Wikipedia, printed on Jun. 29, 2018.
Supervised learning, Wikipedia, printed on Apr. 25, 2018.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllers/xbox-wireless-controller on Jan. 30, 2017.
Devices for Controlling Computers Based on Motions and Positions of Hands, U.S. Appl. No. 15/492,915, filed Apr. 20, 2017, Viktor Erivantcev et al., Patented Case, Nov. 26, 2019.
Devices for Controlling Computers Based on Motions and Positions of Hands, U.S. Appl. No. 16/683,648, filed Nov. 14, 2019, Viktor Erivantcev et al., Docketed New Case—Ready for Examination, Dec. 3, 2019.
Calibration of Inertial Measurement Units Attached to Arms of a User to Generate Inputs for Computer Systems, U.S. Appl. No. 15/817,646, filed Nov. 20, 2017, Viktor Erivantcev et al., Notice of Allowance mailed—Application Received in Office of Publications, Feb. 28, 2020.
Tracking Arm Movements to Generate Inputs for Computer Systems, U.S. Appl. No. 15/787,555, filed Oct. 18, 2017, Viktor Erivantcev et al., Patented Case, Jul. 24, 2019.
Tracking Finger Movements to Generate Inputs for Computer Systems, U.S. Appl. No. 15/792,255, filed Oct. 24, 2017, Viktor Erivantcev et al., Patented Case, Dec. 24, 2019.
Tracking Arm Movements to Generate Inputs for Computer Systems, U.S. Appl. No. 16/508,249, filed Jul. 10, 2019, Viktor Erivantcev et al., Non Final Action dated Aug. 2, 2019.
Tracking Torso Orientation to Generate Inputs for Computer Systems, U.S. Appl. No. 15/813,813, filed Nov. 15, 2017, Viktor Erivantcev et al., Patented Case, Jan. 1, 2020.
Calibration of Inertial Measurement Units Attached to Arms of a User and to a Head Mounted Device, U.S. Appl. No. 15/847,669, filed Dec. 19, 2017, Viktor Erivantcev et al., Patented Case, Dec. 11, 2019.
Correction of Accumulated Errors in Inertial Measurement Units Attached to a User, U.S. Appl. No. 15/868,745, filed Jan. 11, 2018, Viktor Erivantcev et al., Docketed New Case—Ready for Examination, Mar. 2, 2018.
Tracking Torso Leaning to Generate Inputs for Computer Systems, U.S. Appl. No. 15/864,860, filed Jan. 8, 2018, Viktor Erivantcev et al., Patented Case, Nov. 26, 2019.
Tracking User Movements to Control a Skeleton Model in a Computer System, U.S. Appl. No. 15/973,137, filed May 7, 2018, Viktor Erivantcev et al., Non Final Action dated May 13, 2019.
Motion Predictions of Overlapping Kinematic Chains of a Skeleton Model used to Control a Computer System, U.S. Appl. No. 15/996,389, filed Jun. 1, 2018, Viktor Erivantcev et al., Patented Case, Aug. 28, 2019.
Motion Predictions of Overlapping Kinematic Chains of a Skeleton Model used to Control a Computer System, U.S. Appl. No. 16/532,880, filed Aug. 6, 2019, Viktor Erivantcev et al., Awaiting TC Resp, Issue Fee Payment Verified, Mar. 20, 2020.
Calibration of Measurement Units in Alignment with a Skeleton Model to Control a Computer System, U.S. Appl. No. 16/044,984, filed Jul. 25, 2018, Viktor Erivantcev et al., Non Final Action dated Feb. 6, 2020.
Calibration of Inertial Measurement Units in Alignment with a Skeleton Model to Control a Computer System based on Determination of Orientation of an Inertial Measurement Unit from an Image of a Portion of a User, U.S. Appl. No. 16/576,661, filed Sep. 19, 2019, Viktor Erivantcev et al., Docketed New Case—Ready for Examination, Oct. 21, 2019.
Oritentation Determination based on Both Images and Inertial Measurement Units, U.S. Appl. No. 16/576,672, filed Sep. 19, 2019, Viktor Erivantcev et al., Docketed New Case—Ready for Examination, Oct. 28, 2019.

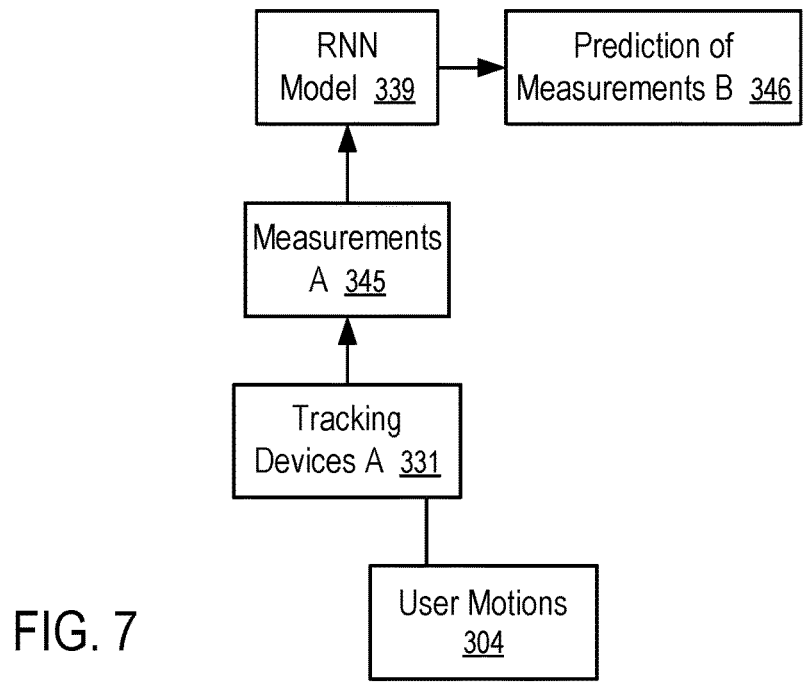

FIG. 7

Attach tracking devices to at least one kinematic chain of a person, including first tracking devices that are separated by one or more second tracking devices on one or more kinematic chains  401

Perform a plurality of sequences of actions involving the least one kinematic chain, starting from a calibration pose  403

Record orientations of the first and second tracking devices in the sequences, where orientations of the first tracking devices are tracked using both a first system and a second system and orientations of the one or moresecond tracking devices are tracked using the second system  405

Train an artificial neural network to predict the orientations of the first and second tracking devices measured by the second system based on the orientations of the first tracking devices measured by the first system  407

FIG. 8

MOTION PREDICTIONS OF OVERLAPPING KINEMATIC CHAINS OF A SKELETON MODEL USED TO CONTROL A COMPUTER SYSTEM

RELATED APPLICATIONS

The present application is a continuation application of U.S. patent application Ser. No. 16/532,880, filed Aug. 6, 2019, which is a continuation application of U.S. patent application Ser. No. 15/996,389, filed Jun. 1, 2018, issued as U.S. Pat. No. 10,416,755 on Sep. 17, 2019, and entitled "Motion Predictions of Overlapping Kinematic Chains of a Skeleton Model used to Control a Computer System," the entire disclosures of which applications are hereby incorporated herein by reference.

The present application relates to U.S. patent application Ser. No. 15/973,137, filed May 7, 2018 and entitled "Tracking User Movements to Control a Skeleton Model in a Computer System," U.S. patent application Ser. No. 15/868,745, filed Jan. 11, 2018 and entitled "Correction of Accumulated Errors in Inertial Measurement Units Attached to a User," U.S. patent application Ser. No. 15/864,860, filed Jan. 8, 2018 and entitled "Tracking Torso Leaning to Generate Inputs for Computer Systems," U.S. patent application Ser. No. 15/847,669, filed Dec. 19, 2017 and entitled "Calibration of Inertial Measurement Units Attached to Arms of a User and to a Head Mounted Device," U.S. patent application Ser. No. 15/817,646, filed Nov. 20, 2017 and entitled "Calibration of Inertial Measurement Units Attached to Arms of a User to Generate Inputs for Computer Systems," U.S. patent application Ser. No. 15/813,813, filed Nov. 15, 2017 and entitled "Tracking Torso Orientation to Generate Inputs for Computer Systems," U.S. patent application Ser. No. 15/792,255, filed Oct. 24, 2017 and entitled "Tracking Finger Movements to Generate Inputs for Computer Systems," U.S. patent application Ser. No. 15/787,555, filed Oct. 18, 2017 and entitled "Tracking Arm Movements to Generate Inputs for Computer Systems," and U.S. patent application Ser. No. 15/492,915, filed Apr. 20, 2017 and entitled "Devices for Controlling Computers based on Motions and Positions of Hands." The entire disclosures of the above-referenced related applications are hereby incorporated herein by reference.

FIELD OF THE TECHNOLOGY

At least a portion of the present disclosure relates to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. App. Pub. No. 2016/0085310 discloses techniques to track hand or body pose from image data in which a best candidate pose from a pool of candidate poses is selected as the current tracked pose.

U.S. Pat. App. Pub. No. 2017/0344829 discloses an action detection scheme using a recurrent neural network (RNN) where joint locations are applied to the recurrent neural network (RNN) to determine an action label representing the action of an entity depicted in a frame of a video.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIGS. 6 and 7 show methods to train a recurrent neural network (RNN) and use the RNN to predict movement measurements of omitted tracking devices based on remaining tracking devices according to one embodiment.

FIGS. 8 and 9 show a method to track user movements using an artificial neural network (ANN) according to one embodiment.

DETAILED DESCRIPTION

The following description and drawings are illustrative and are not to be construed as limiting. Numerous specific details are described to provide a thorough understanding. However, in certain instances, well known or conventional details are not described to avoid obscuring the description. References to one or an embodiment in the present disclosure are not necessarily references to the same embodiment; and, such references mean at least one.

At least some embodiments disclosed herein allow the tracking of a reduced number of portions of a user using micro-electromechanical system (MEMS) inertial measurement units (IMUs) and using an artificial neural network to control a skeleton model in a computer system having more than the reduced number of portions connected via joints, where each portion may be considered as rigid and movable relative other portions through rotation at the joints.

A kinematic chain is an assembly of rigid parts connected by joints. A skeleton model of a user, or a portion of the user, can be constructed as a set of rigid parts connected by joints in a way corresponding to the bones of the user, or groups of bones, that can be considered as rigid parts.

For example, the head, the torso, the left and right upper arms, the left and right forearms, the palms, phalange bones of fingers, metacarpal bones of thumbs, upper legs, lower legs, and feet can be considered as rigid parts that are connected via various joints, such as the neck, shoulders, elbows, wrist, and finger joints.

A skeleton model of a user can be constructed based on rigid models of body parts of the user parts and the corresponding joints; and the relative positions and/or orientations of the rigid parts collectively represent the pose of the user and/or the skeleton model. The skeleton model of the user can be used to control the presentation of an avatar of the user, to identify the gesture inputs of the user, and/or to make a virtual realty or augmented reality presentation of the user.

Figure 1:
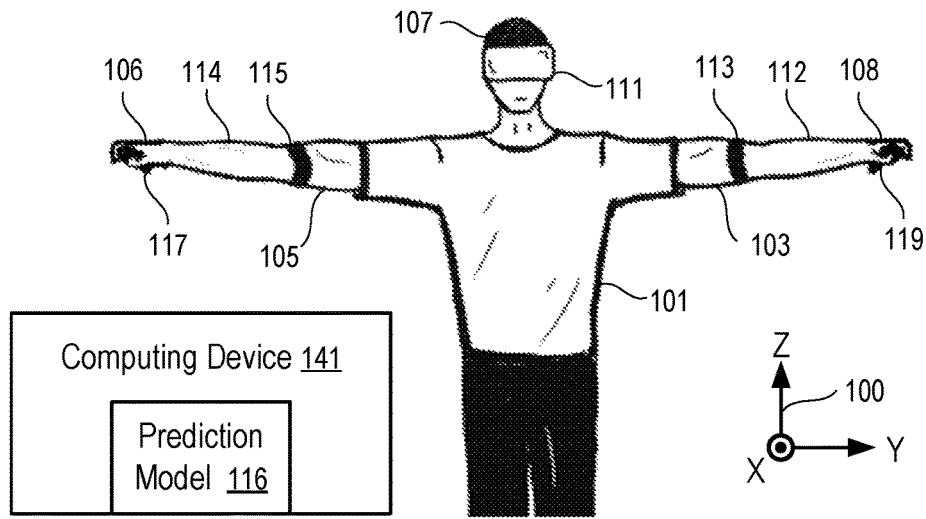
FIG. 1 illustrates a system to track user movements according to one embodiment.

FIG. 1 illustrates a system to track user movements according to one embodiment.

FIG. 1 illustrates various parts of a user, such as the torso (101) of the user, the head (107) of the user, the upper arms (103 and 105) of the user, the forearms (112 and 114) of the user, and the hands (106 and 108) of the user.

In an application illustrated in FIG. 1, the hands (106 and 108) of the user are considered rigid parts movable around the wrists of the user. In other applications, the palms and finger bones of the user can be further tracked for their movements relative to finger joints (e.g., to determine the hand gestures of the user made using relative positions among fingers of a hand and the palm of the hand).

In FIG. 1, the user wears several sensor devices (111, 113, 115, 117 and 119) that track the orientations of parts of the user that are considered, or recognized as, rigid in an application.

In an application illustrated in FIG. 1, rigid parts of the user are movable relative to the torso (101) of the user and relative to each other. Examples of the rigid parts include the head (107), the upper arms (103 and 105), the forearms (112 and 114), and the hands (106 and 108). The joints, such as neck, shoulder, elbow, and/or wrist, connect the rigid parts of the user to form one or more kinematic chains. The kinematic chains can be modeled in a computing device (141) to control the application.

To track the relative positions/orientations of rigid parts in a kinematic chain, a tracking device can be attached to each individual rigid part in the kinematic chain to measure its orientation.

In general, the position and/or orientation of a rigid part in a reference system (100) can be tracked using one of many systems known in the field. Some of the systems may use one or more cameras to take images of a rigid part marked using optical markers and analyze the images to compute the position and/or orientation of the part. Some of the systems may track the rigid part based on signals transmitted from, or received at, a tracking device attached to the rigid part, such as radio frequency signals, infrared signals, ultrasound signals. The signals may correspond to signals received in the tracking device, and/or signals emitted from the tracking device. Some of the systems may use inertial measurement units (IMUs) to track the position and/or orientation of the tracking device.

In FIG. 1, the sensor devices (111, 113, 115, 117 and 119) are used to track some of the rigid parts (e.g., 107, 103, 105, 106, 108) in the one or more kinematic chains, but sensor devices are omitted from other rigid parts (101, 112, 114) in the one or more kinematic chains to reduce the number of sensor devices used and/or to improve user experience for wearing the reduced number of sensor devices.

The computing device (141) has a prediction model (141) trained to generate predicted measurements of parts (101, 112, 114, 107, 103, 105, 106, and/or 108) of the user based on the measurements of the sensor devices (111, 113, 115, 117 and 119).

For example, the prediction model (141) can be implemented using an artificial neural network in the computing device (141) to predict the measurements of the orientations of the rigid parts (101, 112, 114) that have omitted sensor devices, based on the measurements of the orientations rigid parts (107, 103, 105, 106, 108) that have the attached sensor devices (111, 113, 115, 117 and 119).

Further, the artificial neural network can be trained to predict the measurements of the orientations of the rigid parts (107, 103, 105, 106, 108) that would be measured by another system (e.g., an optical tracking system), based on the measurement of the attached sensor devices (111, 113, 115, 117 and 119) that measure orientations using a different technique (e.g., IMUs).

The sensor devices (111, 113, 115, 117, 119) communicate their movement measurements to the computing device (141), which computes or predicts the orientation of the rigid parts (107, 103, 105, 106, 108, 101, 112, 114) by applying the measurements obtained from the attached sensor devices (111, 113, 115, 117 and 119) as inputs to an artificial neural network trained in a way as further discussed below.

In some implementations, each of the sensor devices (111, 113, 115, 117 and 119) communicates its measurements directly to the computing device (141) in a way independent from the operations of other sensor devices.

Alternative, one of the sensor devices (111, 113, 115, 117 and 119) may function as a base unit that receives measurements from one or more other sensor devices and transmit the bundled and/or combined measurements to the computing device (141). In some instances, the artificial neural network is implemented in the base unit and used to generate the predicted measurements that are communicated to the computing device (141).

Preferably, wireless connections made via a personal area wireless network (e.g., Bluetooth connections), or a local area wireless network (e.g., Wi-Fi connections) are used to facilitate the communication from the sensor devices (111, 113, 115, 117 and 119) to the computing device (141).

Alternatively, wired connections can be used to facilitate the communication among some of the sensor devices (111, 113, 115, 117 and 119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141).

The hand (106), the forearm (114), and the upper arm (105) can be considered a kinematic chain, for which an artificial neural network can be trained to predict the orientation measurements generated by an optical track system, based on the sensor inputs from the sensor devices (117 and 115) that are attached to the hand (106) and the upper arm (105), without a corresponding device on the forearm (114).

Optionally or in combination, the hand module (e.g., 117) may combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111). The head module (111) may further determine the orientation of the torso (101) from the orientation of the arm modules (115 and 113) and/or the orientation of the head module (111), using an artificial neural network trained for a corresponding kinematic chain, which includes the upper arms (103 and 105), the torso (101), and/or the head (107).

For the determination of the orientation of the torso (101), the hand modules (117 and 119) are optional in the system illustrated in FIG. 1.

Further, in some instances the head module (111) is not used in the tracking of the orientation of the torso (101) of the user.

Typically, the measurements of the sensor devices (111, 113, 115, 117 and 119) are calibrated for alignment with a common reference system, such as a coordinate system (100).

After the calibration, the hands, arms (105, 103), the head (107) and the torso (101) of the user may move relative to each other and relative to the coordinate system (100). The measurements of the sensor devices (111, 113, 115, 117 and 119) provide orientations of the hands (106 and 108), the upper arms (105, 103), and the head (107) of the user relative to the coordinate system (100). The computing device (141) computes, estimates, or predicts the current orientation of the torso (101) and/or the forearms (112 and 114) from the current orientations of the upper arms (105, 103), the current orientation the head (107) of the user, and/or the current orientation of the hands (106 and 108) of the user and their orientation history using the prediction model (116).

Optionally or in combination, the computing device (141) may further compute the orientations of the forearms from the orientations of the hands (106 and 108) and upper arms (105 and 103), e.g., using a technique disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

At least some embodiments disclosed herein allow the determination or estimation of the orientation of the torso (101) and/or the forearms (112 and 114) from the orientations of the upper arms (105 and 103), the orientation of the head (107), and/or the orientation of the hands (106 and 108) without the need for additional sensor modules being attached to the torso (101) and the forearms (112 and 114).

Figure 2:
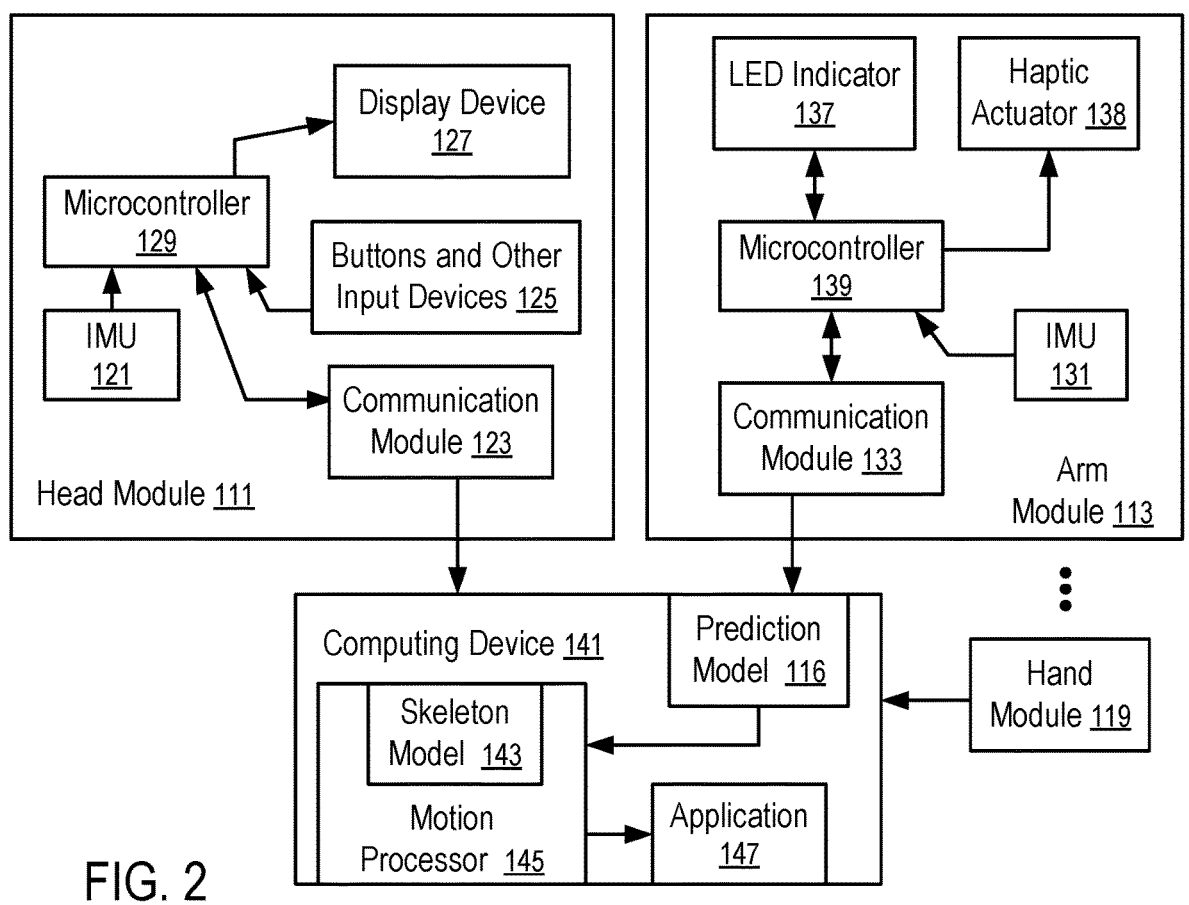
FIG. 2 illustrates a system to control computer operations according to one embodiment.

FIG. 2 illustrates a system to control computer operations according to one embodiment. For example, the system of FIG. 2 can be implemented via attaching the arm modules (115 and 113) to the upper arms (105 and 103) respectively, the head module (111) to the head (107) and/or hand modules (117 and 119), in a way illustrated in FIG. 1.

In FIG. 2, the head module (111) and the arm module (113) have micro-electromechanical system (MEMS) inertial measurement units (IMUs) (121 and 131) that measure motion parameters and determine orientations of the head (107) and the upper arm (103).

Similarly, the hand modules (117 and 119) can also have IMUs. In some applications, the hand modules (117 and 119) measure the orientation of the hands (106 and 108) and the movements of fingers are not separately tracked. In other applications, the hand modules (117 and 119) have separate IMUs for the measurement of the orientations of the palms of the hands (106 and 108), as well as the orientations of at least some phalange bones of at least some fingers on the hands (106 and 108). Examples of hand modules can be found in U.S. patent application Ser. No. 15/792,255, filed Oct. 24, 2017 and entitled "Tracking Finger Movements to Generate Inputs for Computer Systems," the entire disclosure of which is hereby incorporated herein by reference.

Each of the IMUs (131 and 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a prediction model (116) and a motion processor (145). The measurements of the IMUs (e.g., 131, 121) from the head module (111), arm modules (e.g., 113 and 115), and/or hand modules (e.g., 117 and 119) are used in the prediction module (116) to generate predicted measurements of at least some of the parts that do not have attached sensor modules, such as the torso (101), and forearms (112 and 114). The predicted measurements and/or the measurements of the IMUs (e.g., 131, 121) are used in the motion processor (145).

Figure 3:
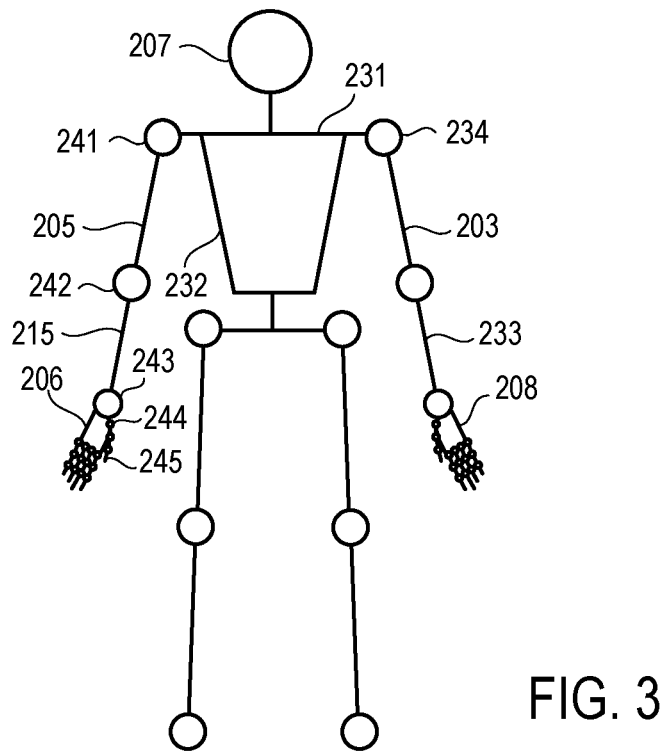
FIG. 3 illustrates a skeleton model that can be controlled by tracking user movements according to one embodiment.

The motion processor (145) has a skeleton model (143) of the user (e.g., illustrated FIG. 3). The motion processor (145) controls the movements of the parts of the skeleton model (143) according to the movements/orientations of the corresponding parts of the user. For example, the orientations of the hands (106 and 108), the forearms (112 and 114), the upper arms (103 and 105), the torso (101), the head (107), as measured by the IMUs of the hand modules (117 and 119), the arm modules (113 and 115), the head module (111) sensor modules and/or predicted by the prediction model (116) based on the IMU measurements are used to set the orientations of the corresponding parts of the skeleton model (143).

Since the torso (101) does not have a separately attached sensor module, the movements/orientation of the torso (101) is predicted using the prediction model (116) using the sensor measurements from sensor modules on a kinematic chain that includes the torso (101). For example, the prediction model (116) can be trained with the motion pattern of a kinematic chain that includes the head (107), the torso (101), and the upper arms (103 and 105) and can be used to predict the orientation of the torso (101) based on the motion history of the head (107), the torso (101), and the upper arms (103 and 105) and the current orientations of the head (107), and the upper arms (103 and 105).

Similarly, since a forearm (112 or 114) does not have a separately attached sensor module, the movements/orientation of the forearm (112 or 114) is predicted using the prediction model (116) using the sensor measurements from sensor modules on a kinematic chain that includes the forearm (112 or 114). For example, the prediction model (116) can be trained with the motion pattern of a kinematic chain that includes the hand (106), the forearm (114), and the upper arm (105) and can be used to predict the orientation of the forearm (114) based on the motion history of the hand (106), the forearm (114), the upper arm (105) and the current orientations of the hand (106), and the upper arm (105).

The skeleton model (143) is controlled by the motion processor (145) to generate inputs for an application (147) running in the computing device (141). For example, the skeleton model (143) can be used to control the movement of an avatar/model of the arms (112, 114, 105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera, etc.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

When a hand module (e.g., 117 or 119) tracks the orientations of the palm and a selected set of phalange bones, the motion pattern of a kinematic chain of the hand captured in the predictive mode (116) can be used in the prediction model (116) to predict the orientations of other phalange bones that do not wear sensor devices.

FIG. 2 shows a hand module (119) and an arm module (113) as examples. In general, an application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms (112 and 114) of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model that can be controlled by tracking user movements according to one embodiment. For example, the skeleton model of FIG. 3 can be used in the motion processor (145) of FIG. 2.

The skeleton model illustrated in FIG. 3 includes a torso (232) and left and right upper arms (203 and 205) that can move relative to the torso (232) via the shoulder joints (234 and 241). The skeleton model may further include the forearms (215 and 233), hands (206 and 208), neck, head (207), legs and feet. In some instances, a hand (206) includes a palm connected to phalange bones (e.g., 245) of fingers, and metacarpal bones of thumbs via joints (e.g., 244).

The positions/orientations of the rigid parts of the skeleton model illustrated in FIG. 3 are controlled by the measured orientations of the corresponding parts of the user illustrated in FIG. 1. For example, the orientation of the head (207) of the skeleton model is configured according to the orientation of the head (107) of the user as measured using the head module (111); the orientation of the upper arm (205) of the skeleton model is configured according to the orientation of the upper arm (105) of the user as measured using the arm module (115); and the orientation of the hand (206) of the skeleton model is configured according to the orientation of the hand (106) of the user as measured using the hand module (117); etc.

The prediction model (116) can have multiple artificial neural networks trained for different motion patterns of different kinematic chains.

For example, a clavicle kinematic chain can include the upper arms (203 and 205), the torso (232) represented by the clavicle (231), and optionally the head (207), connected by shoulder joints (241 and 234) and the neck. The clavicle kinematic chain can be used to predict the orientation of the torso (232) based on the motion history of the clavicle kinematic chain and the current orientations of the upper arms (203 and 205), and the head (207).

For example, a forearm kinematic chain can include the upper arm (205), the forearm (215), and the hand (206) connected by the elbow joint (242) and the wrist joint (243). The forearm kinematic chain can be used to predict the orientation of the forearm (215) based on the motion history of the forearm kinematic chain and the current orientations of the upper arm (205), and the hand (206).

For example, a hand kinematic chain can include the palm of the hand (206), phalange bones (245) of fingers on the hand (206), and metacarpal bones of the thumb on the hand (206) connected by joints in the hand (206). The hand kinematic chain can be used to predict the orientation of the phalange bones and metacarpal bones based on the motion history of the hand kinematic chain and the current orientations of the palm, and a subset of the phalange bones and metacarpal bones tracked using IMUs in a hand module (e.g., 117 or 119).

For example, a torso kinematic chain may include clavicle kinematic chain and further include forearms and/or hands and legs. For example, a leg kinematic chain may include a foot, a lower leg, and an upper leg.

An artificial neural network of the prediction model (116) can be trained using a supervised machine learning technique to predict the orientation of a part in a kinematic chain based on the orientations of other parts in the kinematic chain such that the part having the predicted orientation does not have to wear a separate sensor device to track its orientation.

Further, an artificial neural network of the prediction model (116) can be trained using a supervised machine learning technique to predict the orientations of parts in a kinematic chain that can be measured using one tracking technique based on the orientations of parts in the kinematic chain that are measured using another tracking technique.

For example, the tracking system as illustrated in FIG. 2 measures the orientations of the modules (111, 113, . . . , 119) using IMUs (e.g., 111, 113, . . . ). The inertial-based sensors offer good user experiences, have less restrictions on the use of the sensors, and can be implemented in a computational efficient way. However, the inertial-based sensors may be less accurate than certain tracking methods in some situations, and can have drift errors and/or accumulated errors through time integration.

For example, an optical tracking system can use one or more cameras to track the positions and/or orientations of optical markers that are in the fields of view of the cameras. When the optical markers are within the fields of view of the cameras, the images captured by the cameras can be used to compute the positions and/or orientations of optical markers and thus the orientations of parts that are marked using the optical markers. However, the optical tracking system may not be as user friendly as the inertial-based tracking system and can be more expensive to deploy. Further, when an optical marker is out of the fields of view of cameras, the positions and/or orientations of optical marker cannot be determined by the optical tracking system.

An artificial neural network of the prediction model (116) can be trained to predict the measurements produced by the optical tracking system based on the measurements produced by the inertial-based tracking system. Thus, the drift errors and/or accumulated errors in inertial-based measurements can be reduced and/or suppressed, which reduces the need for re-calibration of the inertial-based tracking system.

Figure 4:
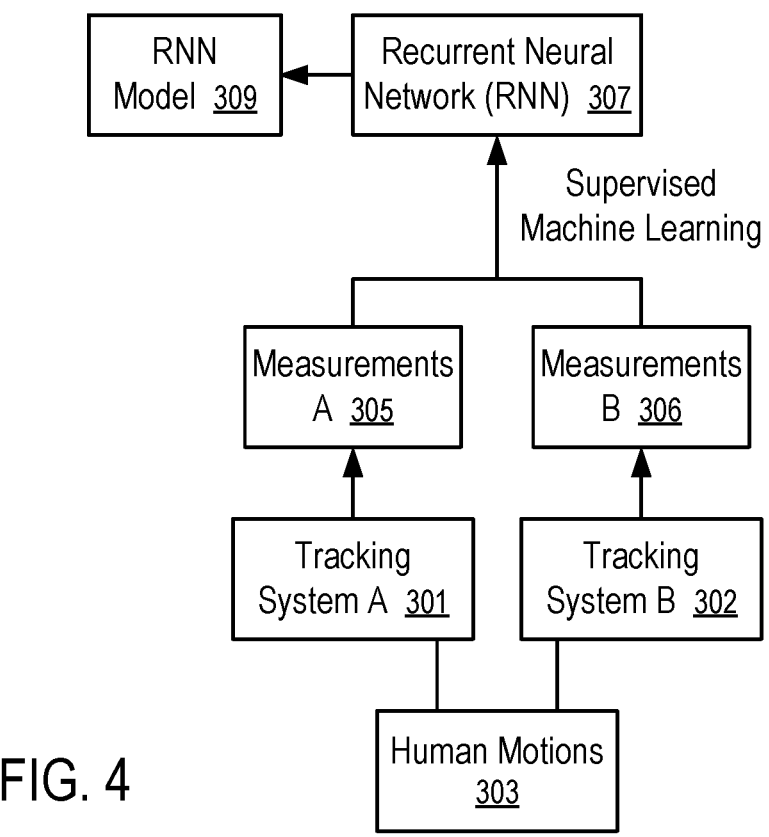
FIGS. 4 and 5 show methods to train a recurrent neural network (RNN) and use the RNN to predict movement measurements of one tracking system based on movement measurements of another tracking system according to one embodiment.

FIG. 4 shows a method to train a recurrent neural network (RNN) (307). For example, the method of FIG. 4 can be used to generate the prediction model (116) of FIG. 1 and/or FIG. 2.

In FIG. 4, human motions (303) are tracked/measured using two tracking systems (301 and 302). For example, the inertial-based system of FIG. 2 can be used as the tracking system A (301); and an optical tracking system can be used as the tracking system B (302).

For example, a person can wear the sensor devices (111, 113, 115, 117 and 119) that contains the IMUs (e.g., 121, 131, . . . ) for the inertial-based system. To train the recurrent neural network (RNN) (307), optical markers can be attached to the person for the optical tracking system (e.g., 302).

Optionally, the optical markers can be integrated on the sensor devices (111, 113, 115, 117 and 119) to track the motions (303) for the training of the prediction model (116) that includes the recurrent neural network (RNN) (307).

Optionally, additional optical markers are attached to certain parts of the user that do not wear the sensor devices that contain IMUs. For example, the forearms (112 and 114) and the torso (101) of the user, as illustrated in FIG. 1 do not have attached IMUs for the measurements of their orientations via the inertial-based system (e.g., 301); however, the forearms (112 and 114) and the torso (101) of the user can have optical markers to measure their orientations using the optical tracking system (e.g., 302).

In general, the optical tracking system (e.g., 302) can be replaced with another tracking system that makes the orientation measurements based on infrared signals, ultrasound signals, radio frequency identification tag (RFID) signal, etc. Further, a combination of tracking systems can be used as the tracking system B (302) to obtain the most accurate measurements B (306) of the human motions (303). The tracking system B (302) is used to measure the orientations of at least some of the parts of the person not measured by the tracking system A (301) and optionally the parts of the person that are measured by the tracking system A (301).

After the person wears the sensor modules and optical markers for the tracking system A (301) and the tracking system B (302), the person may perform a plurality of sequences of actions that involve various motion patterns of the kinematic chains.

The sequences can start from a common calibration pose, such as a pose as illustrated in FIG. 1. Other examples of calibration poses can be found in U.S. patent application Ser. No. 15/847,669, filed Dec. 19, 2017 and entitled "Calibration of Inertial Measurement Units Attached to Arms of a User and to a Head Mounted Device," U.S. patent application Ser. No. 15/817,646, filed Nov. 20, 2017 and entitled "Calibration of Inertial Measurement Units Attached to Arms of a User to Generate Inputs for Computer Systems," the entire disclosures of which applications are hereby incorporated herein by reference.

The positions and/or orientations of the parts of the person, such as the head (107), the arms (103, 105, 112, 114) and hands (106 and 108), and torso (101), can be measured/tracked using the tracking systems A and B (301 and 302) concurrently to generate measurements A and B (305 and 306) respectively.

The recurrent neural network (RNN) (307) can be trained, using a supervised machine learning technique, to predict the measurements B (306) generated by the tracking system B (302) (e.g., an optical tracking system, another tracking system, or a combination of tracking systems) based on the measurement A (305) generated by the tracking system A (301) (e.g., an inertial-based system as illustrated in FIG. 2). The supervised machine learning technique adjusts the parameters in the recurrent neural network (RNN) (307) to minimize the difference between the actual measurements B (306) and the predictions made using the measurements A (305) as input to the recurrent neural network (RNN) (307). The recurrent neural network (RNN) (307) having the adjusted parameters provide a RNN model (309) that can be used as the prediction model (116) in FIG. 1 and/or FIG. 2.

The recurrent neural network (RNN) (307) may include a network of Long Short-Term Memory (LSTM) units to selectively remember histories of states based on which predictions are made.

The sequences of actions performed by the person performing the human motions (303) can be sampled at a predetermined time interval to obtain the measurements (305 and 306) for the training of the recurrent neural network (RNN) (307).

In some instances, some sequences of actions are repeated multiple times and/or at different speeds; and scaling of the time measurement and/or double exponential smoothing can be applied to input parameters to align the datasets of the sequences and/or to normalize the time scale.

After the RNN model (309) is trained to have the capability to predict the measurements B (306) generated using the tracking system B (302), it is no longer necessary to use the tracking system B (302). For example, the RNN model (309) can be developed in a manufacturing facility and/or a developer's facility. Users of sensor modules (e.g., 111, 113, . . . , 119) do not need to wear optical markers or other devices that are used in the tracking system B (302), as illustrated in FIG. 5.

Figure 5:
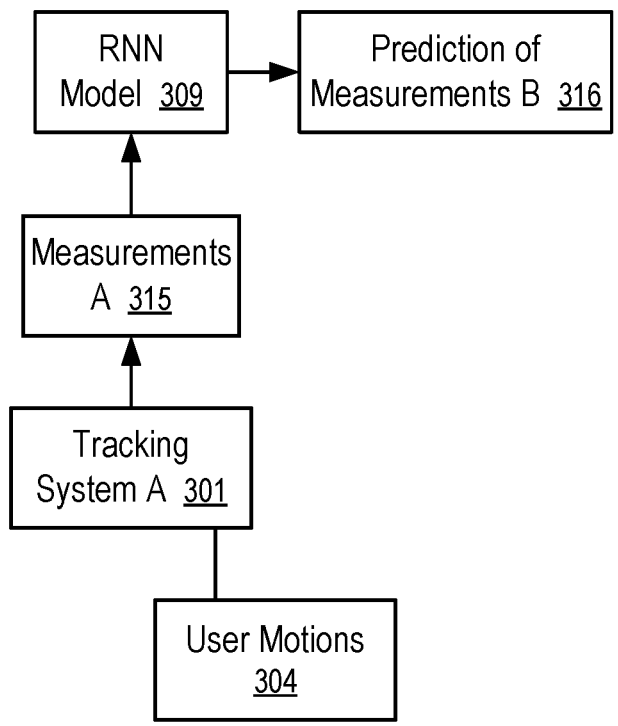

FIG. 5 shows a method to use the RNN to predict movement measurements of one tracking system based on movement measurements of another tracking system according to one embodiment.

In FIG. 5, a tracking system A (301) (e.g., the inertial-based system illustrated in FIG. 2) is used to track user motions (304) of a user without tracking system B (302) (e.g., an optical tracking system). The measurements A (315) of the user motions (304) measured using the tracking system A (301) (e.g., the inertial-based system illustrated in FIG. 2) are used in the RNN model (309) to generate the predictions (316) of measurements B that would be generated by the tracking system B (302). The predictions (316) of measurements B can be provided to the motion processor (145) to control the skeleton model (143) (e.g., as illustrated in FIG. 3), as if the tracking system B (302) were used to obtain the measurements.

For example, an RNN model (309) having LSTM units can be trained to predict the orientation measurements generated by an optical tracking system for a kinematic chain using orientation measurements of part of the kinematic chain generated by the sensor modules having the IMUs.

For example, sensors modules (113 and 119) are attached to the upper arm (103) and the hand (119) in a forearm kinematic chain using measurements generated from the IMUs (e.g., 131) in the sensor modules (113 and 119). The RNN model (309) predicts, from the IMU measurements for a sequence of the user motions (304), the orientation measurements that would be generated by an optical tracking system not only for the forearm (112) in the forearm kinematic chain but also for the upper arm (103) and the hand (108). The predicted orientation measurements are used in the motion processor (145) to configure the corresponding forearm kinematic chain of the skeleton (143), including the forearm (233), the upper arm (203) and the hand (208).

In some instances, it is not necessary to use a tracking system implemented using one technique (e.g., optical tracking system) to calibrate the measurements of a tracking system implemented using another technique (e.g., inertial-based tracking system). The prediction model (116) can be trained to predict the orientations of parts that have missing sensor modules without using multiple training technologies, as illustrated in FIG. 6.

Figure 6:
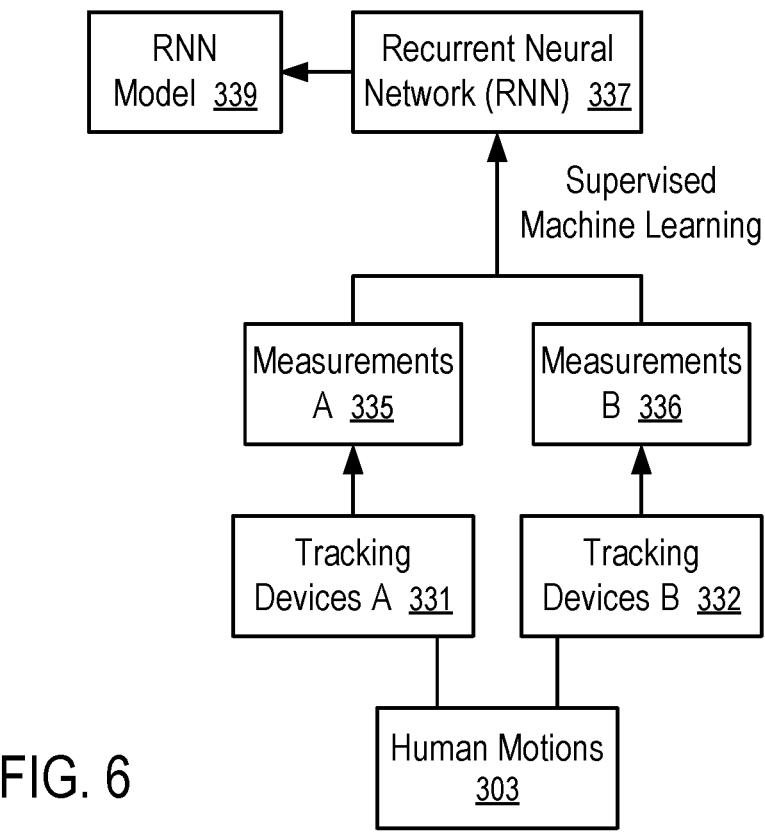

FIG. 6 shows a method to train a recurrent neural network (RNN) (337) to predict the measurements of missing sensor modules.

In FIG. 6, human motions (303) of a person wearing both tracking devices A (331) and tracking devices B (332) are measured. For example, the tracking devices A (331) correspond to the head module (111), arm modules (113 and 115) and hand modules (117 and 119) as illustrated in FIG. 1 and/or FIG. 2. In FIG. 1, sensor modules are missing from the forearms (112 and 114) and the torso (101).

To train a recurrent neural network (RNN) (337) to predict the measurements of the missing sensor modules, the method of FIG. 6 uses the tracking devices B (332) that are additional IMU modules attached the forearms (112 and 114) and the torso (101). The additional IMU modules can be similar to the arm module (113) and attached to the forearms (112 and 114) and the torso (101) via armband, strap and/or other ways to attach the module to the respective locations on the person that performs the human motion.

A supervised machine learning technique can be applied to the recurrent neural network (RNN) (337) using the measurements A (335) generated by the tracking devices A (331) to predict the measurements B (336) generated by the tracking devices B (333). The supervised machine learning adjusts the parameters of the recurrent neural network (RNN) (337) to minimize the differences between the measurements B (336) and their predictions made by applying the measurements A (335) as input to the recurrent neural network (RNN) (337). The recurrent neural network (RNN) (337) and its trained parameters provide the RNN model (339) that can be used to make the prediction of the measurements of the tracking devices B (332). Thus, when the RNN model (339) is used, the tracking devices B (332) can be omitted, as illustrated in FIG. 7.

FIG. 7 shows a method to use the RNN trained using the method of FIG. 6 to predict movement measurements of missing sensor modules based on movement measurements of attached sensor modules according to one embodiment.

In FIG. 7, tracking devices A (331) (e.g., 111, 113, 115, 117 and 119 in FIG. 1 and/or FIG. 2) are used to track user motions (304) of a user without tracking devices B (332). The measurements A (345) of the user motions (304) measured using the tracking devices A (331) (e.g., 111, 113, 115, 117 and 119) are used as input to the RNN model (339) to generate the predictions (346) of measurements B that would be generated by the tracking devices B (332) if the tracking devices B (332) were used. The measurements A (345) and the predictions (346) of measurements B can be provided to the motion processor (145) to control the skeleton model (143) (e.g., as illustrated in FIG. 3), as if both the tracking devices A (331) and the tracking devices B (332) were used.

For example, an RNN model (339) having LSTM units can be trained to predict the orientation measurements generated by sensor modules having IMUs for one or more parts of a kinematic chain using orientation measurements of the remaining parts of the kinematic chain generated by the sensor modules having the IMUs such that the sensor modules having IMUs can be omitted for the one or more parts of a kinematic chain.

For example, sensors modules (113 and 119) are attached to the upper arm (103) and the hand (119) in a forearm kinematic chain using measurements generated from the IMUs (e.g., 131) in the sensor modules (113 and 119). The RNN model (339) predicts, from the IMU measurements for a sequence of the user motions (304), the orientation measurements that would be generated by a sensor module having an IMU (e.g., similar to the arm module (113)) if such a sensor module were attached to the forearm (112) in the forearm kinematic chain. The predicted orientation measurements (346) for the forearm (112) and the measurements for the upper arm (103) and the hand (119) are used together in the motion processor (145) to configure the corresponding forearm kinematic chain of the skeleton (143), including the forearm (233), the upper arm (203) and the hand (208).

Since the prediction (346) can be obtained from the use of the sensor modules (113 and 119) without actually using a sensor module to track the orientation of the forearm (112), the user performing the user motions (304) does not have to wear the additional sensor module on the forearm (112). Thus, the user experience is improved; and the cost of the tracking system for the user is reduced.

FIG. 8 shows a method to train an artificial neural network to predict orientation measurements.

The method of FIG. 8 includes attaching (401) tracking devices to at least one kinematic chain of a person, including first tracking devices that are separated by second tracking devices on one or more kinematic chains.

For example, the first tracking devices are an arm module (115) on an upper arm (105) and a hand module (117) on a hand (106); and the one or more second tracking devices include a tracking device on a forearm (114) on a forearm kinematic chain that includes the upper arm (105), the forearm (114), and the hand (106) connected via the elbow joint and the wrist joint. The tracking device on the forearm (114) separates the arm module (115) and the hand module (117) on the forearm kinematic chain. The arm module (115) and the hand module (117) include IMUs to track their orientations in an inertial-based tracking system and can have optical markers to separately measure their orientations using an optical tracking system. The tracking device on the forearm (114) can be an optical marker used to measure its orientation in the optical tracking system and can optionally include an IMU to track its orientation in the inertial-based tracking system. When the tracking device on the forearm (114) enables tracking in both the inertial-based tracking system and the optical tracking system, the tracking device on the forearm (114) can be implemented in a same way as the arm module (115).

The method of FIG. 8 further includes performing (403) a plurality of sequences of actions (303) involving the least one kinematic chain. The sequences of actions (303) start from a common calibration pose (e.g., as illustrated in FIG. 1 or another pose). The actions can be designed to simulate typical actions in an application (147), such as a virtual reality game, an augmented reality application, etc.

The method of FIG. 8 further includes: recording (405) orientations of the first and second tracking devices in the sequences, where orientations of the first tracking devices are tracked using both a first system (301) (e.g., an inertial-based tracking system) and a second system (302) (e.g., an optical tracking system) and orientations of the one or more second tracking devices are tracked using the second system (302). Optionally, the orientations of the one or more second tracking devices can also be tracked using the first system (301) (e.g., the inertial-based tracking system) and used in situations where the second system (302) is incapable of measuring the orientation of the one or more second tracking devices. For example, when in a certain position, the optical marker on the forearm (114) is out of the field of view of a tracking camera of the optical tracking system, the orientation determined from the IMU attached to the forearm (114) can be used to generate an orientation measurement of the forearm (114). For example, when the optical marker is visible before and/or after the obscured position in an action sequence, the orientation measurements of the forearm (114) obtained from the IMU measurements of the forearm (114) can be calibrated via the measurements from the optical tracking system to calculate an orientation of the forearm at the obscured position with an improved accuracy that is substantially the same as the measurement from the optical tracking system.

The method of FIG. 8 further includes: training (407) an artificial neural network (e.g., 307) to predict the orientations of the first and second tracking devices measured by the second system (302) (e.g., an optical tracking system) based on the orientations of the first tracking devices measured by the first system (301) (e.g., an inertial-based tracking system).

In some instances, different kinematic chains are separated trained using separate artificial neural networks. The trained networks can be used separately for the individual kinematic chains for improved computational efficiency. Alternatively, an artificial neural network can be trained for the kinematic model of the entire skeleton (143) for universal applications.

The trained artificial neural network can be re-trained using a reinforcement learning technique to improve its prediction accuracy in some motion scenarios.

Figure 9:
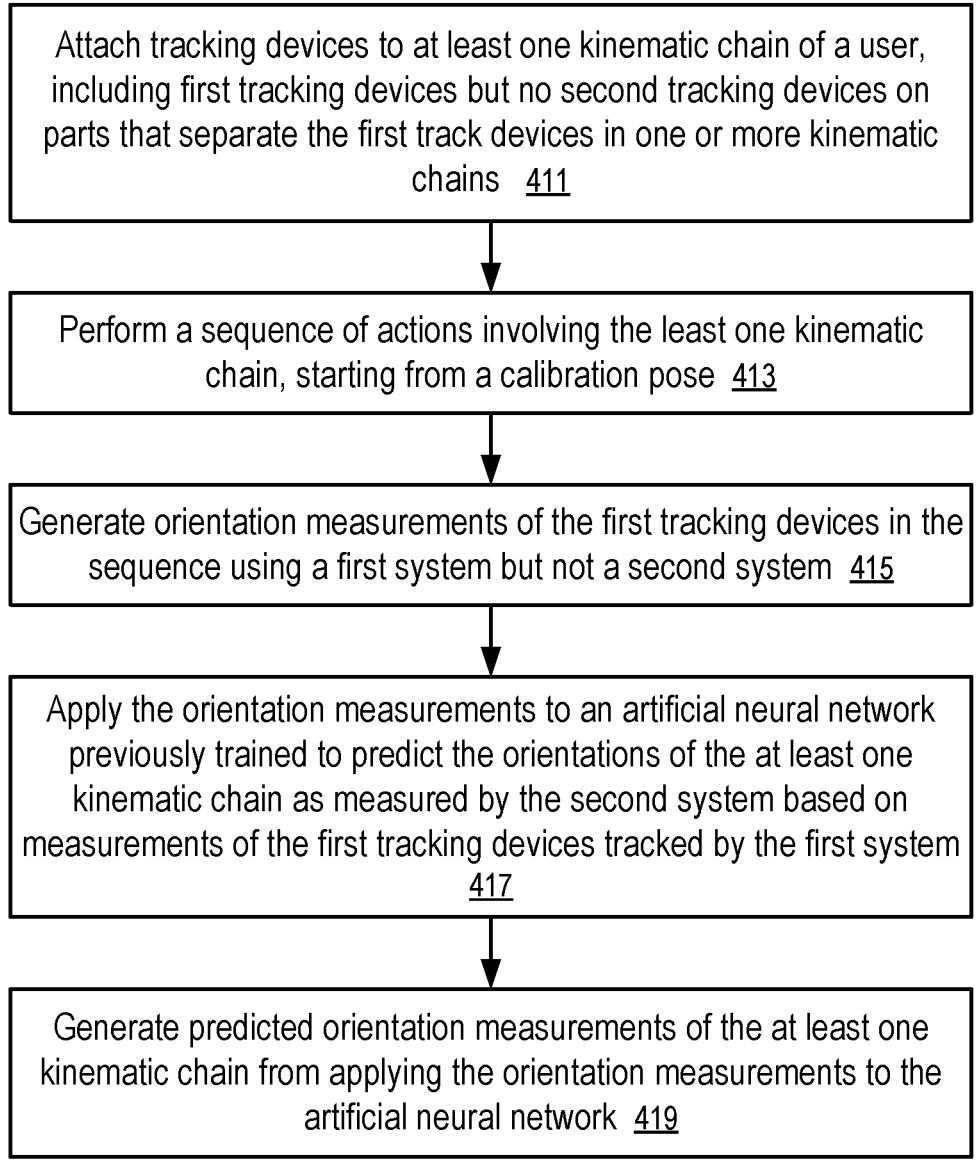

FIG. 9 shows a method to track user movements using the artificial neural network trained using the method of FIG. 8.

The method of FIG. 9 includes: attaching (411) tracking devices to at least one kinematic chain of a user, including first tracking devices but no second tracking devices on parts that separate the first track devices in one or more kinematic chains; performing (413) a sequence of actions (304) involving the least one kinematic chain, starting from a calibration pose; generating (415) orientation measurements of the first tracking devices in the sequence using a first system (301) but not a second system (302); applying (417) the orientation measurements to an artificial neural network, previously trained (e.g., using the method of FIG. 9) to predict the orientations of the at least one kinematic chain as measured by the second system (302) based on measurements of the first tracking devices tracked by the first system (301); and generating (419) predicted orientation measurements of the at least one kinematic chain from applying the orientation measurements to the artificial neural network.

For example, a computing system includes: a plurality of sensor modules (e.g., 111, 113, 115, 117, and/or 119) and a computing device (141). Each of the sensor modules has an inertial measurement unit (e.g., 121 or 113) and is attached to a portion (e.g., 107, 113, 115, 106, or 108) of the user to generate motion data identifying a sequence of orientations of the respective portion of the user. The inertial measurement unit includes a micro-electromechanical system (MEMS) gyroscope and may further include a magnetometer and a MEMS accelerometer. The computing device provides the sequences of orientations measured by the sensor modules as input to an artificial neural network (e.g., 116), obtains at least an orientation measurement of a part of the user as output from the artificial neural network (e.g., 116), uses the orientation measurement obtained from the artificial neural network to configure or set the orientation of a rigid part in a kinematic chain of a skeleton model (143) representative of the user, and controls an application (147) according to the state of the skeleton model (143).

For example, the artificial neural network can be a recurrent neural network previously trained to make predictions matching with orientation measurements generated using an optical tracking system. The recurrent neural network contains Long Short-Term Memory (LSTM) units to remember a set of state histories derived from the input sequences of orientations to predict the current orientations of the kinematic chain.

Since the artificial neural network can predict the orientation measurements generated using an optical tracking technique, the part of the user (and other parts of the user) is not tracked using optical tracking.

For example, the orientations of the part of the user is tracked using one of the plurality of sensor modules; and the artificial neural network is used to improve the IMU-based measurements to remove drift error and/or accumulated error.

For example, the orientations of the part of the user is not even tracked using a sensor module containing an inertial measurement unit, since its orientation can be predicted using applying orientation measurements of other parts of the user in the kinematic chain as input to the artificial neural network.

For example, the plurality of sensor modules (e.g., 111, 113, 115, 117, and/or 119) tracks portions (e.g., 107, 103, 105, 106, and/or 108) of the user correspond to a subset of rigid parts (e.g., 207, 203, 205, 206 and/or 208) in the kinematic chain of the skeleton model (143); and the rigid part (e.g., 215, 223, or 232) corresponding to the part (e.g., 114, 114, or 101) of the user that is not tracked separates, in the kinematic chain, the subset of rigid parts (e.g., 207, 203, 205, 206 and/or 208).

For example, the artificial neural network is trained to predict orientation measurements generated using a separate tracking system; and the artificial neural network provides, as output, predicted orientation measurements to be generated by the separate tracking system for the portions (e.g., 107, 103, 105, 106, and/or 108) of the user to which the plurality of sensor modules (e.g., 111, 113, 115, 117, and/or 119) are attached.

For example, to train the artificial neural network, a set of sensor modules are attached to a person who performs a plurality of sequence of motions to generate first orientation measurements and second orientation measurements from the set of sensor modules. A supervised machine learning technique is used to train the artificial neural network to predict the second orientation measurements based on the first orientation measurements.

For example, the first orientation measurements are measured using a first technique; the second orientation measurements are measured using a second technique; and the artificial neural network is trained to predict the measurements made using the second technique (e.g., optical tracking) based on the measurements generated using the first technique (e.g., IMU-based tracking).

For example, when the artificial neural network is found to have inaccurate predictions in some scenarios, the artificial neural network can be further trained using a reinforcement learning technique, based on further measurements made in connection with such scenarios.

In some instances, the second orientation measurements identify orientations of the plurality of sensor modules; and the first orientation measurements identify orientations of a subset of the plurality of sensor modules such that measurements of the subset of sensor modules made using one tracking technique (e.g., IMU-based tracking) can be used with the artificial neural network to predict the orientation measurements of the entire set of sensor modules made using another tracking technique (e.g., optical tracking).

In other instances, the first orientation measurements identify orientations of a first subset of the plurality of sensor modules; and the second orientation measurements identify orientations of a second subset of the plurality of sensor modules, such that the measurement from one subset of the sensor devices can be used to predict the measurements made by another subset of the sensor devices.

The skeleton model (143) can include multiple ANN models. Each of the ANN models is trained to predict, using measurements obtained using a tracking system A (301) (e.g., an IMU-based system, such as that illustrated in FIG. 2), the motion measurements of parts of a kinematic chain that would have been measured using a tracking system B (302) (e.g., an optical tracking system). However, when two ANN models are used to predict the motion measurements of two kinematic chains that have an overlapping portion, the ANN models can generate different predictions for the same overlapping portion.

For example, a forearm ANN model can be used to predict the motion/orientation measurements of a forearm chain that contains the hand (106), the forearm (114) and the upper arm (105). A clavicle ANN model can be used to predict the motion/orientation measurements of a clavicle chain that contains the left upper arm (105), the torso (101), and the right upper arm (103) (and optionally the head (107)).

Using the forearm ANN model, the upper arm (105) is predicted to have an orientation, which is in general different from the orientation of the upper arm (105) predicted using the clavicle ANN model.

To use both the forearm ANN model and the clavicle ANN model, a further ANN can be used to consider the discrepancy generated by the forearm ANN model and the clavicle ANN model and predict an orientation of the upper arm (105), in a way similar to that discussed below in connection with FIG. 10.

Figure 10:
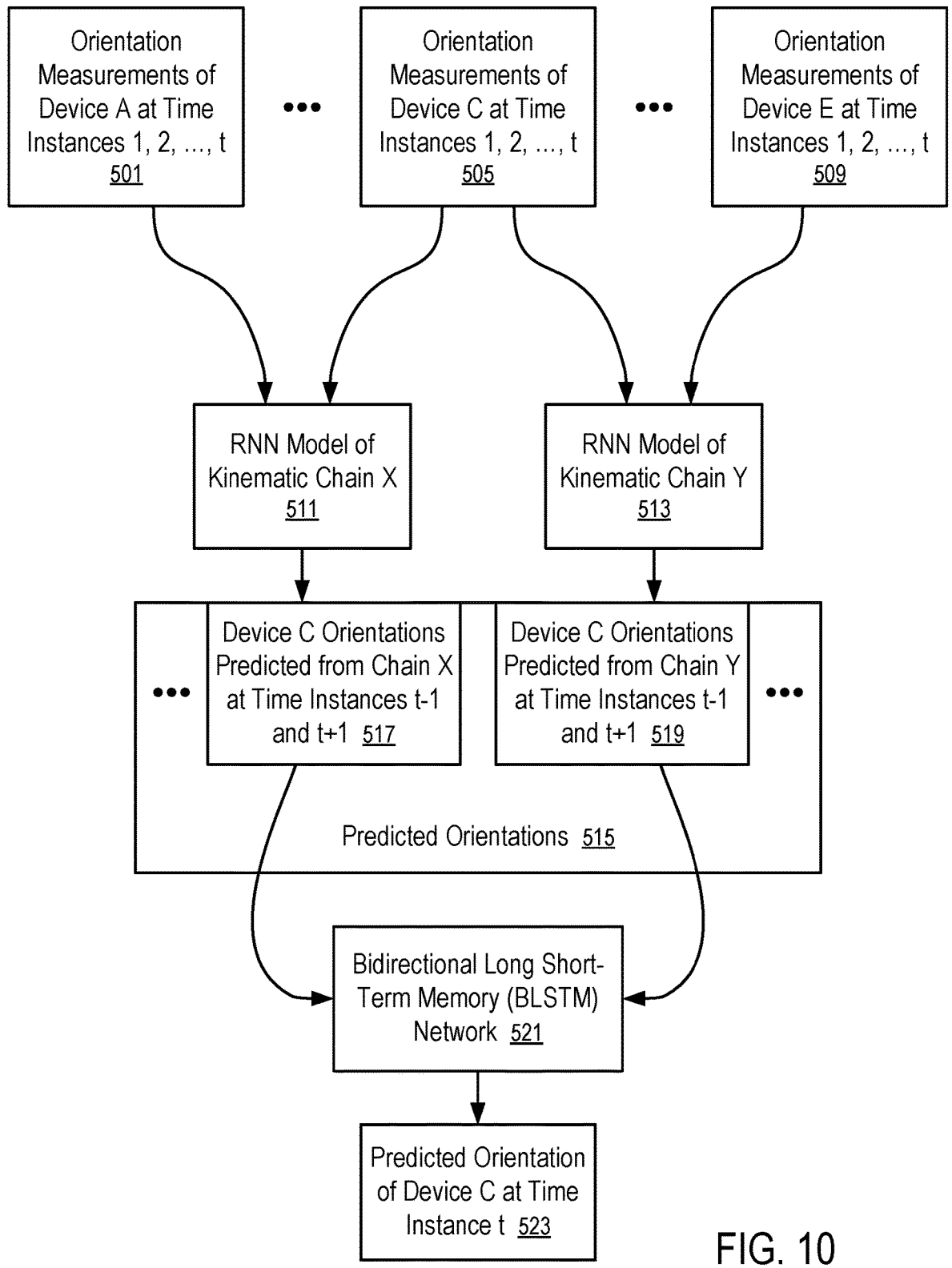
FIG. 10 illustrates the use of a bidirectional long short-term memory (BLSTM) network to combine the results from different artificial neural networks according to one embodiment.

FIG. 10 illustrates the use of a bidirectional long short-term memory (BLSTM) network to combine the results from different artificial neural networks according to one embodiment.

In FIG. 10, a set of devices (A, ..., C, ..., E) are used to generate their orientation measurements at time instances 1, 2, ..., t, where the time instances are sequentially number for identification. The adjacent time instances can have a fixed, predetermined time interval, or variable time intervals that are dependent on the speed of motion.

In FIG. 10, two RNN models (511 and 513) are used for the prediction of motion measurements, such as the orientations of parts of a user and/or the corresponding rigid parts of a skeleton model (143) representing the user in a virtual reality application, or an augmented reality application. One RNN model (511) is trained for the prediction of motion measurements of kinematic chain X (e.g., a forearm kinematic chain); and another RNN model (513) is trained for the prediction of motion measurements of kinematic chain Y (e.g., a clavicle kinematic chain). For example, a forearm kinematic chain is tracked using the hand module (117) and the arm module (115) to generate input measurements of their orientations for a corresponding RNN model (e.g., 511); and a clavicle kinematic chain is tracked using the arm modules (113 and 115) and optionally the head module (111) to generate input measurements of their orientations for another corresponding RNN model (e.g., 513). The tracking of the forearm kinematic chain and the tracking of the clavicle kinematic chain can be performed using two sets of sensor devices (e.g., 115 and 117; and 113, 115, and 111) that share a common sensor device, such as the arm module (115). The forearm kinematic chain and the clavicle kinematic chain share a common part (e.g., the upper arm (105)), which orientation of which is measured using the common sensor device C, such as the arm module (115).

From the sequences of orientation measurements (501, ..., 505) from the devices (e.g., 117 and 115) for kinematic chain X (e.g., the forearm kinematic chain) at time instances 1, 2, ..., t, the RNN model (511) generates a portion of the predicted measurements (515) that includes the predicted orientations (517) of the common sensor device C (e.g., arm module (115)) at time instances t−1 and t+1. The device C (e.g., arm module (115)) also be used to generate inputs (505) to the kinematic chain Y (e.g., the clavicle kinematic chain).

In one implementation, the devices (A, C, and E) provide orientation measurements (501, ..., 505, ..., 509) at each of the time instances 1, 2, ..., t. When the measurements at time instance t is provided to the RNN models (511 and 513), the RNN models (511 and 513) generate the predicted measurements (517 and 519) of the shared device C at a time instance before t at t−1 and at a time instance after t at t+1. The RNN models (511 and 513) can optionally update a prediction of a measurement at a time instance t−1 when input measurements at time instance t that is after the time instance t−1 becomes available.

For example, when the sequences of input measurements are provided as input to the RNN models (511 and 513) for time instances 1, 2, ..., t−2, the RNN models (511 and 513) can generate the predicted measurements of the shared device C at a time instance before the last instance t−2 at t−3 and a time instance after the last instance t−2 at t−1. After the input measurements for time instances t−1 and t are further added to the RNN models (511 and 513), the RNN model (511 and 513) can optionally update the prediction for the measurement at the time instance t−1 using the input measurements at time instances t−1 and t.

Alternatively, the predicted measurements of the past time instances are stored and used as inputs to the BLSTM network (521). For example, the predicted orientation measurements of device C at the time instance t−1 is generated based on the sequences of input measurements at time instances 1, 2, ..., t−2, which is stored and used in the BLSTM network (521) when the sequences of input measurements at time instances 1, 2, ..., t allows the RNN model (511 and 513) to generate the predicted orientation measurements of device C at the time instance t+1.

From the sequences of orientation measurements (505, ..., 509) from the devices (e.g., 115, 111 and 113) for kinematic chain Y (e.g., the clavicle kinematic chain) at time instances 1, 2, ..., t, the RNN model (513) generates a portion of the predicted measurements (519), including the predicted orientations (517) of the device C (e.g., arm module (115)) at time instances t−1 and t+1.

Since the device C (e.g., arm module (115)) is in both the kinematic chain X (e.g., the forearm kinematic chain) and the kinematic chain Y (e.g., the clavicle kinematic chain), different predicted measurements (515 and 519) are generated for the device C (e.g., arm module (115)) at time instances t−1 and t+1. The different predictions at times t−1 and t+1 are provided as input to a bidirectional long short-term memory (BLSTM) network (521) to generate a predicted orientation of device C (e.g., arm module (115)) at the time instance t.

The bidirectional long short-term memory (BLSTM) network (521) can be trained using a supervised machine learning technique.

For example, the tracking system A (301) (e.g., an IMU-based tracking system) can be used to generate input measurement A (305), including input measurements for the kinematic chain X (e.g., the forearm kinematic chain) and input measurements for the kinematic chain Y (e.g., the clavicle kinematic chain). The tracking system B (302) (e.g., an optical tracking system) can be used to generate desired measurement B (306) includes desired measurements for the kinematic chain X (e.g., the forearm kinematic chain) and desired measurements for the kinematic chain Y (e.g., the clavicle kinematic chain). The RNN models (511 and 513) are separated trained to predict the desired measurements B (306) from the input measurements A (305). Further, the outputs of the RNN models (511 and 513) are used as inputs to the BLSTM network (521), which is further trained to predict the desired measurement of the device C as in the measurements B (306) generated by the tracking system B (302).

In FIG. 10, the BLSTM network (521) does not use the predicted orientation measurements of device C at time instance t, predicted from the RNN models (511 and 513), in generating the predicted orientation (523) of device C at time instance t.

In other implementations, the BLSTM network (521) may receive further inputs, such as the orientation measured by device C at time instance t, the orientation(s) measured by device C before the time instance t, and/or orientations measured by other devices in the kinematic chains X and Y at the time instance t and/or other time instances.

FIG. 10 illustrates an example of combining two kinematic chains. The system can be extended to combining more than two kinematic chains. For example, the left forearm kinematic chain can be tracked using sensing devices (119, 113); the right forearm kinematic chain can be tracked using sensing devices (117 and 115); and the clavicle kinematic chain can be tracked using sensing devices (113, 115, and optionally 111). The left forearm kinematic chain and the clavicle kinematic chain share a common part (103) that is tracked using a common device (113); and the right forearm kinematic chain and the clavicle kinematic chain share a common part (105) that is tracked using a common device (115). RNN models for the left forearm kinematic chain and the clavicle kinematic chain can generate different predicted orientation measurements for their shared device (113) and part (103); and RNN models for the right forearm kinematic chain and the clavicle kinematic chain can generate different predicted orientation measurements for their shared device (115) and part (105). Two BLSTM networks (e.g., 521) can be used, one to combine the different predictions for the shared device (113) in the left forearm kinematic chain and the clavicle kinematic chain, and the other to combine the different predictions for the shared device (115) in the right forearm kinematic chain and the clavicle kinematic chain. The BLSTM networks (e.g., 521) respectively generate predicted orientations of the shared devices (113 and 115).

Alternatively, a single BLSTM network (e.g., 521) can be used to combine the different predictions for the shared device (113) in the left forearm kinematic chain and the clavicle kinematic chain and the different predictions for the shared device (115) in the right forearm kinematic chain and the clavicle kinematic chain to generate predicted orientations of the shared devices (113 and 115) respectively.

FIG. 10 illustrates an example of combining kinematic chains using a BLSTM network (521). In general, other artificial neural networks and/or recurrent neural networks can also be used.

Figure 11:
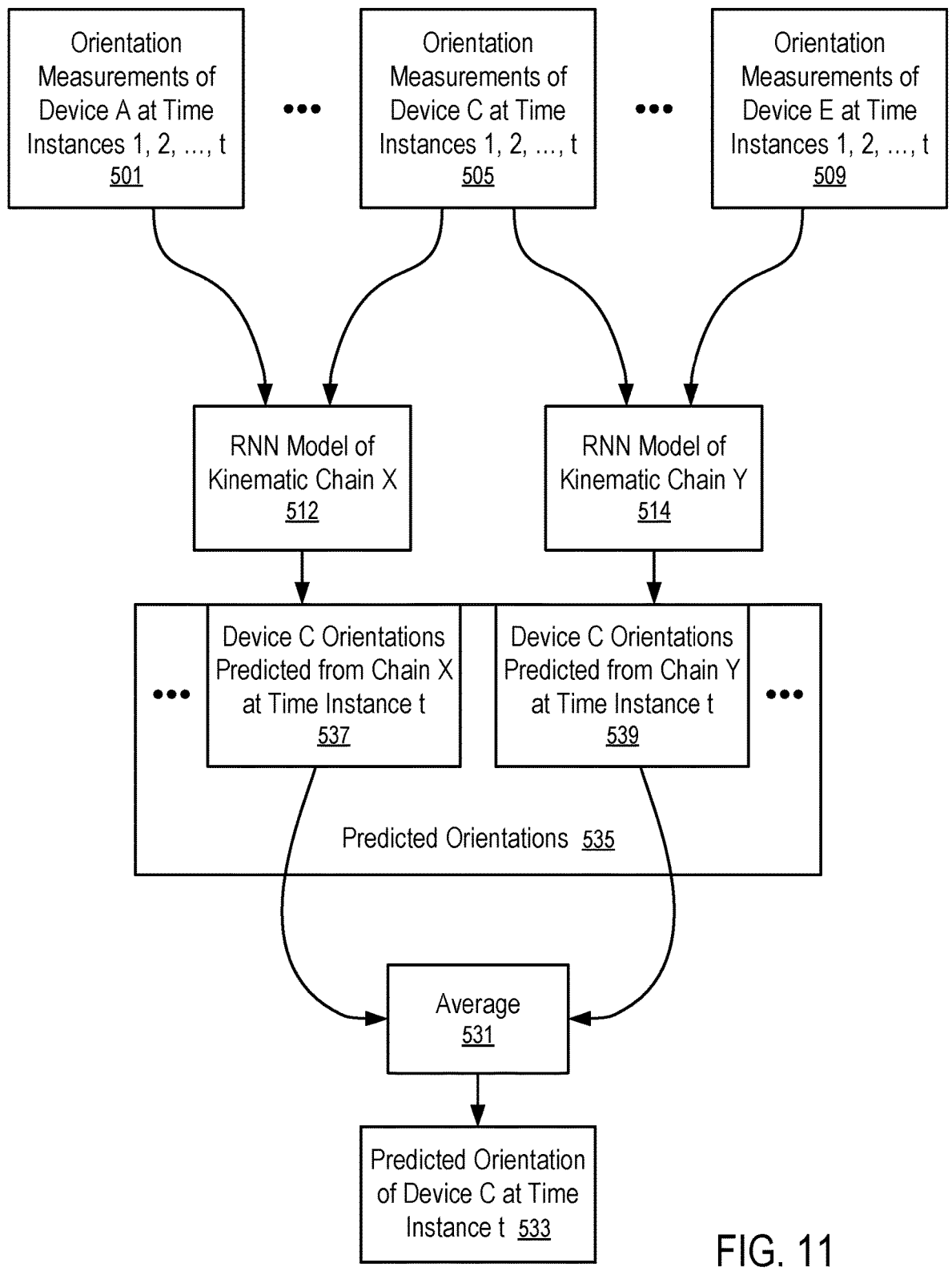
FIG. 11 illustrates another technique to combine the results from different artificial neural networks for kinematic chains that have overlapping portions according to one embodiment.

FIG. 11 illustrates another technique to combine the results from different artificial neural networks for kinematic chains that have overlapping portions according to one embodiment.

In FIG. 11, the devices (A, . . . , C, . . . , E) generate input orientation measurements (501, . . . , 505, . . . , 509) for the RNN models (512 and 514) of different kinematic chains X and Y in a way similar to that discussed in FIG. 10.

In FIG. 11, the predicted orientations (535) include the orientations (537 and 539) predicted for device C at the time instance t, where the device C is shared in the kinematic chains X and Y. An average (531) of the different predictions (537 and 539) from the RNN models (512 and 514) for the different kinematic chains (X and Y) is computed as the predicted orientation (533) of device C at time instance t.

Preferably, to reduce the differences between the different predictions (537 and 539) made for the same device C, the RNN models (512 and 514) are adjusted when both the RNN models (512 and 514) are used. The adjustments are made to the RNN models (512 and 514) to make the predictions (537 and 539) close to the input orientation measurement generated by the device C at the time instance t.

For example, the forget rate of the RNN models (512 and 514) applied to the input measurements (505) generated by device C can be decreased to make the predicted orientations of device C close to the orientation measured by device C.

For example, the forget rate of the RNN models (512 and 514) applied to the input measurements (e.g., 501 and 509) generated by devices other than device C can be increased to make the predicted orientations of device C close to the orientation measured by device C.

For example, the weights of the RNN models (512 and 514) applied to the input measurements (505) generated by device C can be increased to make the predicted orientations of device C close to the orientation measured by device C.

For example, the weights of the RNN models (512 and 514) applied to the input measurements (e.g., 501 and 509) generated by devices other than device C can be decreased to make the predicted orientations of device C close to the orientation measured by device C.

In some instances, when the RNN models (512 and 514) are used together, the RNN models (512 and 514) are further trained to minimize the differences between the predicted measurements (537 and 539) for device C.

In some implementations, the average (531) includes weights obtained using a machine learning technique to predict the orientation measurements made using an optical tracking system. Optionally, the average (531) further receives the orientation measurement of device C at time instance t, with a weight obtained using the supervised machine learning technique.

The techniques of FIG. 10 and FIG. 11 can be combined and used together. For example, the adjusted RNN models (512 and 514) in FIG. 11 that produce reduces differences in the predictions (e.g. 537 and 539) for the share device C can be used in FIG. 10 to replace the separately trained RNN models (511 and 513); and the BLSTM network (521) can be used to generate a predicted orientation (523) from predicted orientations (517 and 519) that have reduced differences in comparison to those generated by the separately trained RNN models (511 and 513). Further, the output of the average (531) can be provided as an input to the BLSTM network (521).

In one implementation, two RNN models (511 and 512) are generated for a kinematic chain X. When the kinematic chain X is tracked without tracking the kinematic chain Y, the RNN model (511) that is trained without considering the differences between the predictions for the device C between the kinematic chains X and Y is used. When the kinematic chain X and the kinematic chain Y are both tracked, the RNN model (512) that is trained and/or adjusted to reduce the differences between the predictions for the device C between the kinematic chains X and Y is used.

Alternatively, after the RNN models (512 and 514) are trained to reduce the differences between the different predictions (537 and 539) for the shared device C, the RNN models (512 and 514) can be used separately. For example, when the kinematic chain X is tracked without tracking the kinematic chain Y, the RNN model (512) is used; and when the kinematic chain Y is tracked without tracking the kinematic chain X, the RNN model (514) is used.

Figure 12:
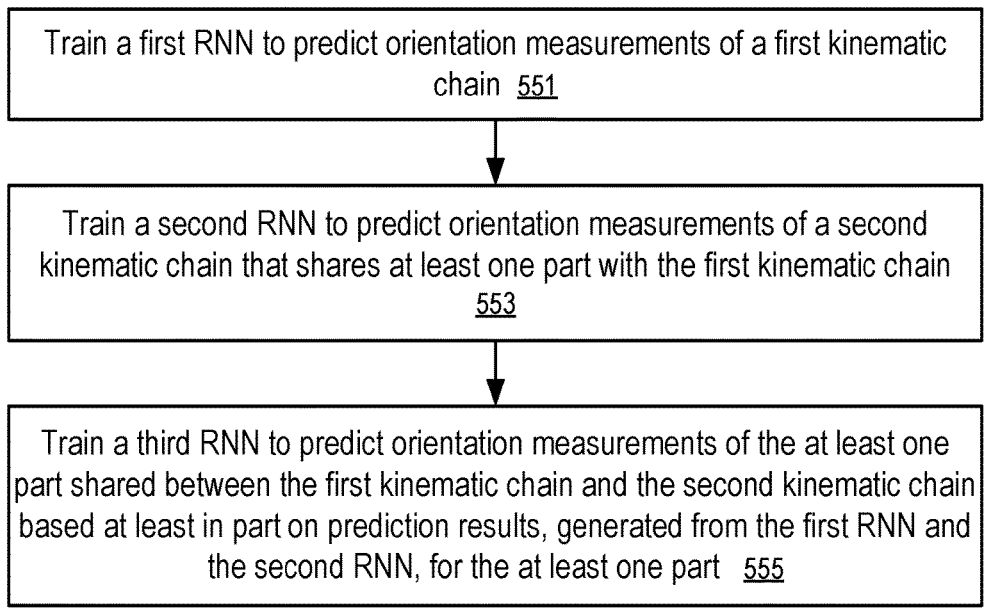
FIG. 12 shows a method to train multiple artificial neural networks for multiple kinematic chains that have overlapping portions according to one embodiment.

FIG. 12 shows a method to train multiple artificial neural networks for multiple kinematic chains that have overlapping portions according to one embodiment. For example, the method of FIG. 12 can be used to generate the RNN models (511 and 513) and the BLSTM network (521) of FIG. 10, and/or the RNN models (512 and 514) of FIG. 11.

The method of FIG. 12 includes training (551) a first RNN (e.g., 511, or 512) to predict orientation measurements of a first kinematic chain (e.g., a forearm kinematic chain). The prediction is made using the measurements A (305) from track system A (301) (e.g., an IMU-based tracking system) to match with the measurements B from tracking system B (302) (e.g., an optical tracking system).

The method of FIG. 12 further includes training (553) a second RNN (e.g., 511 or 512) to predict orientation measurements of a second kinematic chain (e.g., the clavicle kinematic chain) that shares at least one part (e.g., an upper arm) with the first kinematic chain (e.g., the forearm kinematic chain), in a way similar to the training (551) of the first RNN (e.g., 511, or 512).

The method of FIG. 12 further includes training (555) a third RNN (e.g., 521) to predict orientation measurements of the at least one part (e.g., the upper arm) shared between the first kinematic chain (e.g., the forearm kinematic chain) and the second kinematic chain (e.g., the clavicle kinematic chain) based at least in part on prediction results, generated from the first RNN and the second RNN, for the at least one part (e.g., the upper arm).

Optionally, the method of FIG. 12 can further include training the first RNN (e.g., 511, or 512) and the second RNN (e.g., 511 or 512) to reduce prediction differences between the first RNN (e.g., 511, or 512) and the second RNN (e.g., 511 or 512) for the at least one part (e.g., the upper arm) shared between the first kinematic chain (e.g., the forearm kinematic chain) and the second kinematic chain (e.g., the clavicle kinematic chain).

When the first RNN (e.g., 511, or 512) and the second RNN (e.g., 511 or 512) are trained to reduce their prediction differences for the shared part in the first kinematic chain (e.g., the forearm kinematic chain) and the second kinematic chain (e.g., the clavicle kinematic chain), the training of the third RNN (e.g., 521) can be skipped; and an average (531) can be used to combine the different predictions (e.g., 537 and 539).

Figure 13:
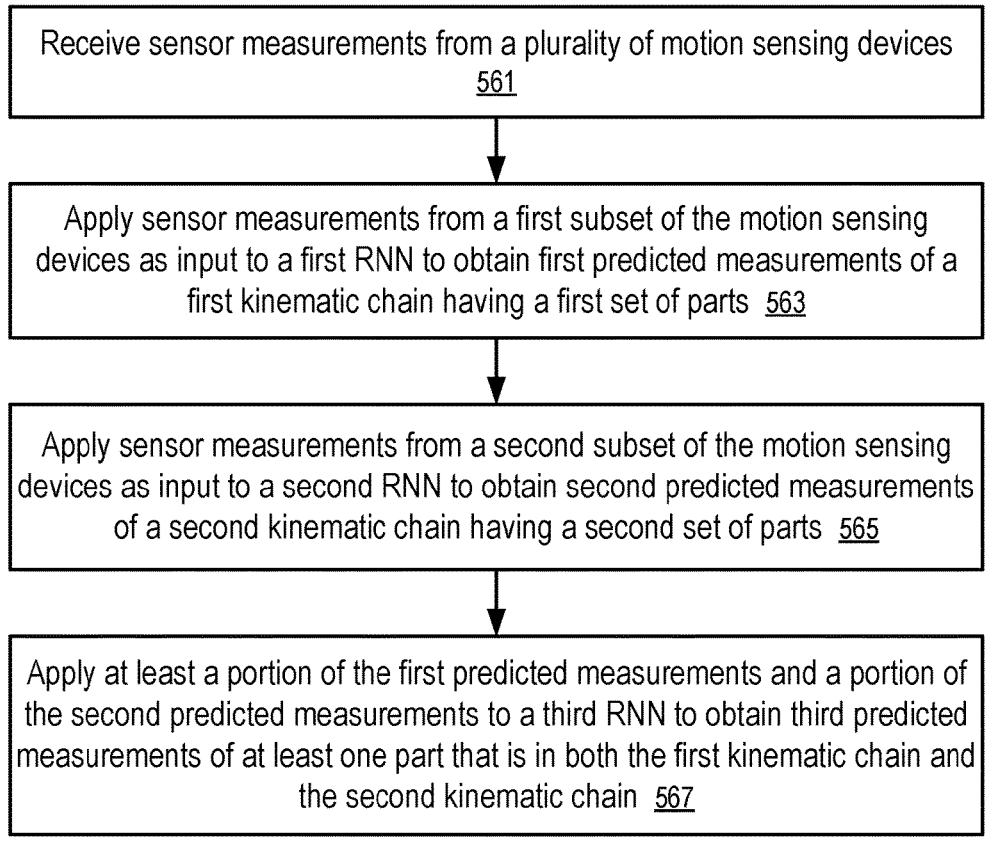
FIG. 13 shows a method to predict motion measurements of an overlapping portion of multiple kinematic chains that are module using separate artificial neural networks according to one embodiment.

FIG. 13 shows a method to predict motion measurements of an overlapping portion of multiple kinematic chains that are module using separate artificial neural networks according to one embodiment. For example, the method of FIG. 13 can be used in a system illustrated in FIG. 10.

The method of FIG. 13 includes: receiving (561) sensor measurements from a plurality of motion sensing devices (e.g., 111, 113, 115, 117, 119); applying (563) sensor measurements from a first subset (e.g., 111, 113, 115) of the motion sensing devices as input to a first RNN (e.g., 511 or 512) to obtain first predicted measurements of a first kinematic chain having a first set of parts (e.g., head (107), torso (101), and upper arms (103 and 105); applying (565) sensor measurements from a second subset (e.g., 117 and 115, and/or 113 and 119) of the motion sensing devices as input to a second RNN (513 or 514) to obtain second predicted measurements of a second kinematic chain having a second set of parts (e.g., hand (106), forearm (114), and upper arm (105); and/or hand (108), forearm (112), and upper arm (103)); and applying (567) at least a portion of the first predicted measurements (e.g., 517 or 537) and a portion of the second predicted measurements (e.g., 519 or 539) to a third RNN (e.g., 521) to obtain third predicted measurements (e.g., 523) of at least one part (e.g., 105 or 103) that is in both the first kinematic chain and the second kinematic chain.

Figure 14:
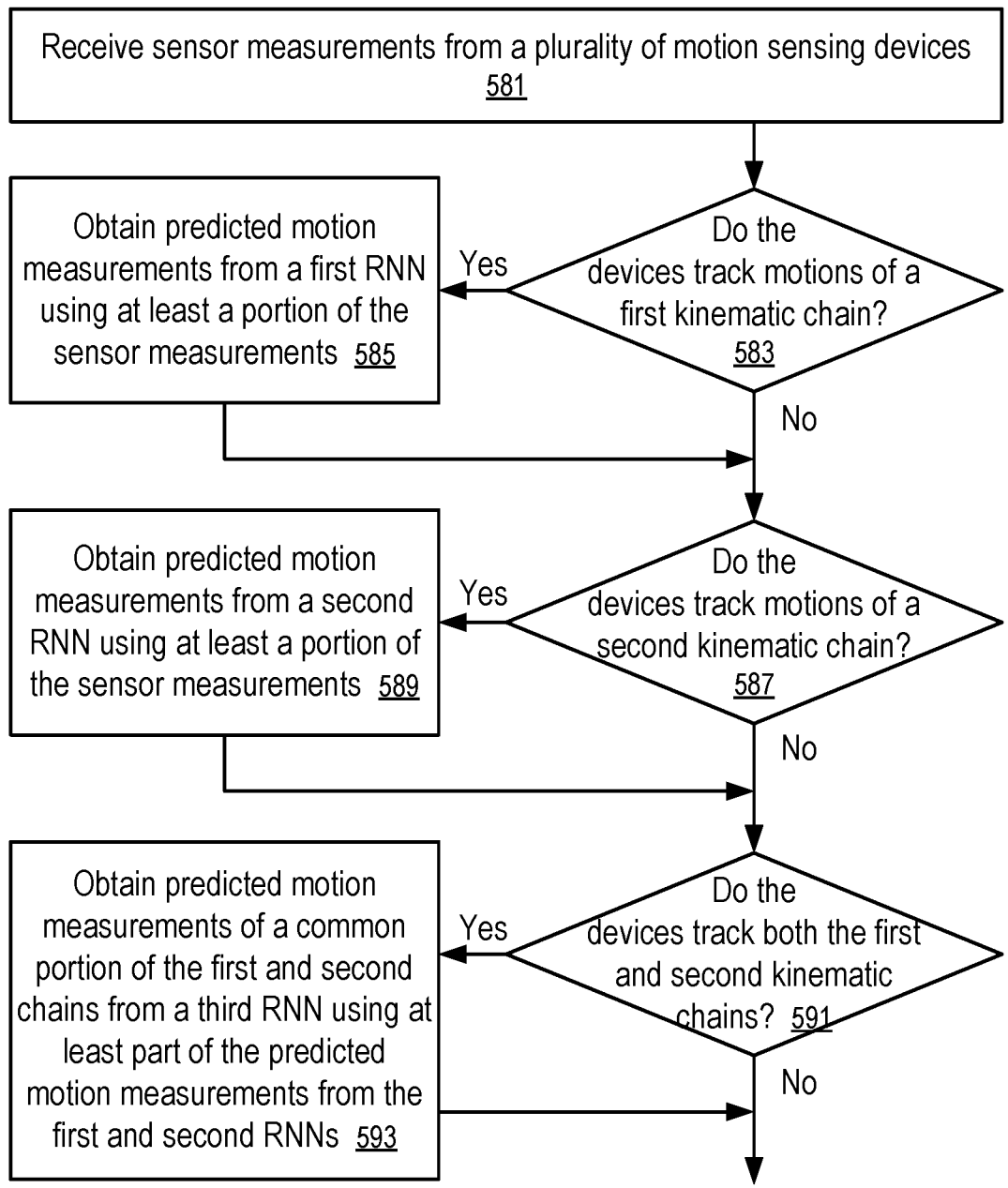
FIG. 14 shows a method to use a skeleton model having multiple artificial neural networks for multiple kinematic chains according to one embodiment.

FIG. 14 shows a method to use a skeleton model having multiple artificial neural networks for multiple kinematic chains according to one embodiment. For example, the method of FIG. 14 can be used in a system illustrated in FIG. 10 or FIG. 11.

The method of FIG. 14 includes receiving (581) sensor measurements from a plurality of motion sensing devices (e.g., 111, 113, 115, 117, and/or 119).

If (583) the devices track motions of a first kinematic chain (e.g., head (107), torso (101), upper arms (105 and 103), the method of FIG. 14 further includes obtaining (585) predicted motion measurements (e.g., 517 and/or 537) from a first RNN (511 or 512) using at least a portion of the sensor measurements.

If (587) the devices track motions of a second kinematic chain (e.g., hand (106), forearm (114), and upper arm (105); or hand (108), forearm (112), and upper arm (103)), the method of FIG. 14 further includes obtaining (589) predicted motion measurements (519 and/or 539) from a second RNN (513 or 514) using at least a portion of the sensor measurements.

If (591) the devices track both the first and second kinematic chains, the method of FIG. 14 further includes obtaining (593) predicted motion measurements (523) of a common portion of the first and second chains from a third RNN (e.g., 521) using at least part of the predicted motion measurements (e.g., 517 and 519) from the first and second RNNs (511 and 513).

In some instances, in response to a determination that the devices track both the first and second kinematic chains, the first RNN (511) and the second RNN are adjusted to reduce the difference between the predictions made for the common portion of the first and second chains.

For example, a system can include: a plurality of sensor modules (e.g., 111, 113, 115, 117, and/or 119); and a computing device (141) coupled to the plurality of sensor modules.

Each respective sensor module (e.g., 111, 113, 115, 117, or 119) has an inertial measurement unit (e.g., 121, 131, . . . ) and is attached to a portion of a user to generate motion data identifying a sequence of orientations of the portion of the user.

The plurality of sensor modules including a first subset (e.g., 111, 113, 115) and a second subset (e.g., 115 and 117) that share a common sensor module (e.g., 115) between the first subset and the second subset.

The computing device (141) provides orientation measurements (e.g., 501, . . . , 505) generated by the first subset (e.g., 111, 113, 115) as input to a first artificial neural network (511 or 512) and obtains, as output from the first artificial neural network (511 or 512), at least one first orientation measurement (e.g., 517 or 537)) of the common part (e.g., 105) of the user, on which part (115) the common sensor module (e.g., 115) is attached.

The computing device (141) further provides orientation measurements (e.g., 505, . . . , 509) generated by the second subset (e.g., 115 and 117) as input to a second artificial neural network (513 or 154) and obtains, as output from the second artificial neural network (513 or 514), at least one second orientation measurement (e.g., 519 or 539) of the common part (e.g., 105) of the user.

The computing device (141) generates a predicted orientation measurement (e.g., 523) of the common part (e.g., 105) of the user from combining (e.g., 521 or 531) the at least one first orientation measurement (517 or 537) of the common part (e.g., 105) of the user and the at least one second orientation measurement (519 or 539) of the common part (e.g., 105) of the user.

For example, the first and second artificial neural networks can be recurrent neural networks containing long short-term memory (LSTM) units; and the combining can be performed using a third artificial neural network (e.g., 521) that at least contains a bidirectional long short-term memory (BLSTM) unit. Alternatively, the combining can be performed via averaging the first orientation measurement (537) of the common part (e.g., 105) of the user and the second orientation measurement (539) of the common part (e.g., 105) of the user.

For example, the predicted orientation measurement (523) of the common part is predicted for a first time instance t; the at least one first orientation measurement (517) of the common part (e.g., 105) of the user includes: an orientation measurement, predicted by the first artificial neural network, of the common part (e.g., 105) at a second time instance t−1 before the first time instance t; and an orientation measurement, predicted by the first artificial neural network (511 or 512), of the common part (e.g., 105) at a third time instance after the first time instance; and the at least one second orientation measurement (519) of the common part (e.g., 105) of the user includes: an orientation measurement, predicted by the second artificial neural network (513 or 514), of the common part (e.g., 105) at the second time instance t−1 before the first time instance t; and an orientation measurement, predicted by the second artificial neural network (e.g., 513 or 514), of the common part (e.g., 105) at the third time instance t+1 after the first time instance t.

In some instances, the predictions made for time instance t−1 are updated in the artificial neural networks (e.g., 511, 514) using the measurements (501, . . . , 505, . . . , 509) at the subsequent time instance t.

For example, the predicted orientation measurement (523 or 533) of the common part (e.g., 105) is predicted to be measured using an optical tracking system that is used to train the artificial neural networks used in the prediction such that the optical tracking system can be eliminated from the system after the artificial neural networks have been trained.

The computing device (141) can have a skeleton model (143). The tracked movements of the user control the movements of corresponding parts of the skeleton model (143). For example, the first subset (e.g., 111, 113 and 115) tracks a first kinematic chain of the user (e.g., head (107), torso (101), and upper arms (103 and 105)) to control movements of a corresponding kinematic chain (e.g., 207, 232, 203 and 205)) of the skeleton model (143); and the second subset (e.g., 115 and 117) tracks a second chain of the user (e.g., hand (106), forearm (114) and upper arm (105) to control movements of a corresponding kinematic chain (206, 215, 205) of the skeleton model (143).

In some instances, orientations of a first part (e.g., torso (101)) in the kinematic chain of the user is not tracked using any inertial measurement unit attached to the first part (e.g., torso (101)); orientations of a second part (e.g., forearm (114)) in the kinematic chain of the user is not tracked using any inertial measurement unit attached to the second part (e.g., forearm (114)); the first artificial neural network (e.g., 511 or 512) predicts orientations of the first part (e.g., torso (101)) from the orientation measurements generated by the first subset (e.g., 111, 113, 115); and the second artificial neural network (e.g., 513 or 514) predicts orientations of the second part (e.g., forearm (114)) from the orientation measurements generated by the second subset (e.g., 115 and 117).

Each inertial measurement unit (e.g., 121, 131, . . . ) can include a micro-electromechanical system (MEMS) gyroscope and optionally, a magnetometer and a MEMS accelerometer.

The artificial neural networks (e.g., 511, 512, 513, 514, 521) can be trained using a separate tracking system that is absent from the system used to track the motion of a user to control the skeleton model (141) in the computing device. For example, the separate tracking system can be an optical tracking system that uses one or more cameras to determine the orientations of optical markers. To generate the training dataset, optical markers can be placed on sensor modules similar to those used to track the motion of the user.

For example, a plurality of sensor modules can be attached to a person who performs motions to generate a training dataset. In a way similar to the tracking of the motion of the user, the plurality of sensor modules include a first subset (e.g., 111, 113 and 115) of the sensor modules to track orientations of a first kinematic chain (e.g., 107, 101, 103 and 105) of the person and a second subset (e.g., 117 and 115) of the sensor modules to track orientations of a second kinematic chain (106, 114 and 105) of the person. The first kinematic chain and the second kinematic chain have a common part (e.g., 105) of the person.

In addition to measuring, using the sensor modules (e.g., 111, 113, 115, 117), a plurality of sequences of orientations of the sensor modules during the person performing a plurality of sequence of motions, the separate tracking system is used to measure, independent of measurements of the sensor modules, the orientations of the sensor modules (e.g., 111, 113, 115, and/or 117) during the person performing a plurality of sequence of motions.

The first artificial neural network (e.g., 511 or 512) is trained using a supervised machine learning technique to predict, using orientation measurements from the first subset (e.g., 111, 113, 115), orientation measurements of the first kinematic chain (e.g., 107, 101, 103 and 105) generated from the separate tracking system.

Similarly, the second artificial neural network (e.g., 513 or 514) is trained using the supervised machine learning technique to predict, using orientation measurements from the second subset (e.g., 115 and 117), orientation measurements of the second kinematic chain (e.g., 106, 114 and 105) generated from the separate tracking system.

The third artificial neural network can be trained using the supervised machine learning technique to predict orientation measurements of the common part (e.g., 105) of the person from first predicted orientation measurements (e.g., 537) of the common part (e.g., 105) of the person generated from the first artificial neural network (e.g., 511 or 512) and second predicted orientation measurements (e.g., 539) of the common part (e.g., 105) of the person generated from the second artificial neural network (e.g., 513 or 514).

Optionally, the first and second artificial neural networks can be further trained (e.g., using an unsupervised machine learning technique) to reduce differences between predictions made for the common part (e.g., 105) of the person from the first and second artificial neural networks respectively.

The present disclosure includes methods and apparatuses which perform these methods, including data processing systems which perform these methods, and computer readable media containing instructions which when executed on data processing systems cause the systems to perform these methods.

For example, the computing device (141), the arm modules (113, 115) and/or the head module (111) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:
a communication device configured to communicate with multiple sensor modules, the sensor modules configured to be attached to multiple portions of a user connected by joints, the sensor modules include a first subset and a second subset that share a common sensor module;
memory storing instructions;
at least one processor coupled to the instructions which, when executed by the at least one processor, causes the computing device to:
calculate, based on orientation measurements generated by the first subset, a first sequence of orientation measurements of a portion of the user on which the common sensor module is attached;
calculate, based on orientation measurements generated by the second subset, a second sequence of orientation measurements of the portion of the user on which the common sensor module is attached;
provide, as input to an artificial neural network, the first sequence of orientation measurements of the portion of the user and the second sequence of orientation measurements of the portion of the user; and
generate, using the artificial neural network based on the first and second sequences of orientation measurements, a third sequence of orientation measurements of the portion of the user.

2. The computing device of claim 1, wherein each respective sensor module in the multiple sensor modules has a micro-electromechanical system (MEMS) gyroscope configured to measure an orientation of the respective sensor module.

3. The computing device of claim 2, wherein the artificial neural network includes at least one bidirectional long short-term memory (BLSTM) unit.

4. The computing device of claim 3, wherein the computing device is configured to use a first artificial neural network having at least one long short-term memory (LSTM) units to calculate the first sequence of orientation measurements of the portion of the user based on the orientation measurements generated by the first subset.

5. The computing device of claim 4, wherein the computing device is configured to use a second artificial neural network having at least one long short-term memory (LSTM) units to calculate the second sequence of orientation measurements of the portion of the user based on the orientation measurements generated by the second sub set.

6. The computing device of claim 4, wherein the first artificial neural network is configured to predict orientation measurements generated by an optical tracking system based on the orientation measurements generated by the first subset.

7. The computing device of claim 6, wherein the computing device is further configured to control, based on predictions generated from the first artificial neural network, movements of a kinematic chain of a skeleton model corresponding to a first kinematic chain of the user tracked using the first subset.

8. The computing device of claim 7, wherein orientations of a first part in the first kinematic chain of the user is not tracked using an inertial measurement unit; and the first artificial neural network is configured to predict orientations of the first part from the orientation measurements generated by the first subset.

9. The computing device of claim 2, wherein the artificial neural network averages the first and second sequences of orientation measurements to generate the third sequence of orientation measurements of the portion of the user.

10. A method, comprising:
receiving, from multiple inertial measurement units attached to multiple portions of a user connected by joints, orientation measurements of the portions of the user, wherein the multiple inertial measurement units include a first subset and a second subset, and wherein the first subset and the second subset share a common inertial measurement unit;
determining, based on orientation measurements generated by the first subset, a first sequence of orientation measurements of a portion of the user on which the common inertial measurement unit is attached;
determining, based on orientation measurements generated by the second subset, a second sequence of orientation measurements of the portion of the user on which the common inertial measurement unit is attached; and
generating, by an artificial neural network using the first and second sequences of orientation measurements as input, a third sequence of orientation measurements of the portion of the user.

11. The method of claim 10, wherein the determining of the first sequence of orientation measurements of the portion of the user is by a first artificial neural network processing the orientation measurements generated by the first subset.

12. The method of claim 11, wherein the determining of the second sequence of orientation measurements of the portion of the user is by a second artificial neural network processing the orientation measurements generated by the second subset.

13. The method of claim 12, wherein the first artificial neural network and the second artificial neural network include long short-term memory (LSTM) units.

14. The method of claim 10, wherein the artificial neural network includes a bidirectional long short-term memory (BLSTM) unit.

15. A method, comprising:
measuring, using multiple sensor modules, sequences of orientations of the sensor modules during a person performing sequences of motions, wherein the sensor modules are attached to the person, including a first subset of the sensor modules attached to track orientations of a first kinematic chain of the person and a second subset of the sensor modules attached to track orientations of a second kinematic chain of the person, wherein the first kinematic chain and the second kinematic chain have a common part of the person;
measuring, using a separate tracking system, orientations of at least the common part of the person during performance of the sequences of motions; and
training an artificial neural network to predict the orientations measurement of the common part of the person as measured by the separate tracking system, based on the sequences of the orientations of the sensor modules measured by the multiple sensor modules.

16. The method of claim 15, wherein the artificial neural network includes a first artificial neural network trained to predict first sequences of orientations of the common part of the person based on measurements generated by the first subset of the sensor modules.

17. The method of claim 16, wherein the artificial neural network further includes a second artificial neural network trained to predict second sequences of orientations of the common part of the person based on measurements generated by the second subset of the sensor modules.

18. The method of claim 17, wherein the artificial neural network further includes a third artificial neural network configured to predict the orientations measurement of the common part of the person as measured by the separate tracking system, based on the first and second sequences of orientations of the common part of the person that are predicted by the first and second artificial neural networks respectively.

19. The method of claim 18, wherein the first artificial neural network and the second artificial neural network include long short-term memory (LSTM) units; and the third artificial neural network includes a bidirectional long short-term memory (BLSTM) unit.

20. The method of claim 16, further comprising:
training the first artificial neural network to reduce differences between:
first orientations of the first kinematic chain predicted by the first artificial neural network based on orientations measured by the first subset during performance of the sequences of motions; and
second orientations of the first kinematic chain measured by the separate tracking system during performance of the sequences of motions.

* * * * *